(12) United States Patent
Cam

(10) Patent No.: US 10,185,832 B2
(45) Date of Patent: Jan. 22, 2019

(54) METHODS AND SYSTEMS FOR DEFENDING CYBER ATTACK IN REAL-TIME

(71) Applicant: U.S. Army Research Laboratory ATTN: RDRL-LOC-I, Adelphi, MD (US)

(72) Inventor: Hasan Cam, Columbia, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 204 days.

(21) Appl. No.: 15/213,434

(22) Filed: Jul. 19, 2016

(65) Prior Publication Data

US 2017/0046519 A1 Feb. 16, 2017

Related U.S. Application Data

(60) Provisional application No. 62/204,118, filed on Aug. 12, 2015.

(51) Int. Cl.
| | |
|---|---|
| G06F 21/57 | (2013.01) |
| G06N 7/00 | (2006.01) |
| G06N 5/04 | (2006.01) |

(52) U.S. Cl.
CPC ......... *G06F 21/577* (2013.01); *G06N 7/005* (2013.01); *G06N 5/043* (2013.01)

(58) Field of Classification Search
CPC .............................. G06F 21/577; G06N 5/022
See application file for complete search history.

(56) References Cited

U.S. PATENT DOCUMENTS

| | | | |
|---|---|---|---|
| 7,472,421 | B2 | 12/2008 | Cummins |
| 7,594,270 | B2 | 9/2009 | Church et al. |
| 8,015,430 | B1 | 9/2011 | Rakic et al. |

(Continued)

OTHER PUBLICATIONS

Fox et al., "An HDP-HMM for Systems with State Persistence", pp. 312-319., Proceedings of the 25th international conference on Machine learning, 2008.*

(Continued)

*Primary Examiner* — Eleni A Shiferaw
*Assistant Examiner* — Hee K Song
(74) *Attorney, Agent, or Firm* — Guy M. Miller; Eric Brett Compton

(57) ABSTRACT

Provided are processes of monitoring or modifying a network of electronically connected assets that dynamically builds relationships and dependencies among detected vulnerabilities in one or more of the assets and sensor measurements so that risk assessment can be achieved more accurately and in real-time. A process includes: identifying a plurality of vulnerabilities on a network of electronically interconnected devices representing one or more critical assets; determining dependencies between each vulnerability in the plurality of vulnerabilities; creating a hidden Markov model representing an attack state of each vulnerability of the plurality of vulnerabilities; determining the exploit likelihood of each of the attack states at a first time; determining the most probable sequences or paths of the attack states; and identifying dynamically the risk of one or more of the critical assets based on the sequences or paths of attack states.

19 Claims, 20 Drawing Sheets

(56) References Cited

U.S. PATENT DOCUMENTS

| | | | |
|---|---|---|---|
| 8,135,830 B2 | 3/2012 | McClure et al. | |
| 8,521,546 B2 | 8/2013 | Brown | |
| 2010/0049564 A1* | 2/2010 | Lewis | G06Q 10/06 |
| | | | 705/7.37 |
| 2012/0304300 A1* | 11/2012 | LaBumbard | G06F 21/577 |
| | | | 726/25 |
| 2013/0227679 A1 | 8/2013 | Zandani | |
| 2014/0007244 A1 | 1/2014 | Martin et al. | |
| 2014/0137257 A1* | 5/2014 | Martinez | H04L 63/1433 |
| | | | 726/25 |
| 2015/0033340 A1* | 1/2015 | Giokas | H04L 63/1433 |
| | | | 726/23 |
| 2015/0058993 A1* | 2/2015 | Choi | H04L 63/1433 |
| | | | 726/25 |
| 2016/0055335 A1* | 2/2016 | Herwono | H04L 63/1408 |
| | | | 726/23 |

OTHER PUBLICATIONS

Wang et al., "Exploring attack graph for cost-benefit security hardening: A probabilistic approach", pp. 158-169., Computers & Security 32 (2013).*

Gangaputra, "Error Minimization in Phoneme based Automated Speech Recognition for Similar Sounding Phonemes", Procedia Engineering 30 (2012) pp. 402-409.*

H. Cam, Controllability and Observability of Risk and Resilience in Cyber-Physical Cloud Systems, Secure Cloud Computing, 2014, pp. 325-343, S. Jajodia et al. (eds.), Springer Science+Business Media, New York 2014.

N. Poolsappasit, R. Derwi, I. Ray, Dynamic Security Risk Management Using Bayesian Attack Graphs, IEEE Transactions on Dependable and Secure Computing, vol. 9, No. 1, Jan./Feb. 2012.

K. Haslum, A. Arnes, Multisensor Real-Time Risk Assessment Using Continuous-Time Hidden Markov Models, Proc. of the 2006 Int. Conf. on Computational Intelligence and Security (CIS '06), 2006.

A. Arnes, K. Sallhammar, K Haslum, T. Brekne, M.E.G. Moe, S.J. Knapskog, Real-Time Risk Assessment with Network Sensors and Intrusion Detection Systems, CIS 2005, Part II, LNAI 3802, pp. 388-397, 2005.

M. Frigault, A. Singhal, S. Jajodia, Measuring Network Security Using Dynamic Bayesian Network, Proc. of QoP '08, Oct. 27, 2008, pp. 23-29, Alexandria, Virginia, USA.

P. Mell, K. Scarfone, S. Romanosky, CVSS A Complete Guide to the Common Vulnerability Scoring System Version 2.0, Jun. 2007.

* cited by examiner

| | AccessVector | AccessComplexity | Authentication | ConfImpact | IntegImpact | AvailImpact | Exploit |
|---|---|---|---|---|---|---|---|
| Vulnerability 1 | NetworkAccessible | low | SingleInstance | None | Complete | Partial | High |
| Vulnerability 2 | NetworkAccessible | low | MultipleInstance | None | Partial | Complete | Not_Defined |
| Vulnerability 3 | LocalNetworkAccess | low | None | Partial | Complete | None | Unproven |
| Vulnerability 4 | localAccess | high | SingleInstance | None | None | None | High |
| Vulnerability 5 | LocalNetworkAccess | low | SingleInstance | Partial | Complete | Partial | Proof_of_Concept |
| Vulnerability 6 | NetworkAccessible | low | None | Complete | Partial | Complete | Functional |
| Vulnerability 7 | NetworkAccessible | medium | None | None | None | Complete | Proof_of_Concept |
| Vulnerability 8 | LocalNetworkAccess | high | MultipleInstance | Partial | Complete | Complete | Functional |
| Vulnerability 9 | LocalNetworkAccess | low | MultipleInstance | Partial | Complete | Partial | Proof_of_Concept |
| Vulnerability 10 | localAccess | medium | SingleInstance | Complete | None | Complete | Functional |
| Vulnerability 11 | LocalNetworkAccess | low | SingleInstance | Partial | Complete | Partial | High |
| Vulnerability 12 | NetworkAccessible | medium | MultipleInstance | None | Complete | None | Proof_of_Concept |
| Vulnerability 13 | NetworkAccessible | low | None | None | Complete | None | Proof_of_Concept |
| Vulnerability 14 | LocalNetworkAccess | high | SingleInstance | None | Complete | Partial | Functional |

FIG. 9

| | BaseScore_Prob | Impact_Prob | Exploitability_Prob | TempExp_Prob | ExpLikelihood_Prob |
|---|---|---|---|---|---|
| Vulnerability 1 | 0.7511 | 0.7844 | 0.7952 | 1 | 0.7952 |
| Vulnerability 2 | 0.6777 | 0.7844 | 0.6390 | 1 | 0.6390 |
| Vulnerability 3 | 0.6808 | 0.7844 | 0.6458 | 0.8500 | 0.5489 |
| Vulnerability 4 | 0 | 0 | 0.1548 | 1 | 0.1548 |
| Vulnerability 5 | 0.6685 | 0.8550 | 0.5137 | 0.9000 | 0.4623 |
| Vulnerability 6 | 0.9668 | 0.9538 | 0.9997 | 0.9500 | 0.9497 |
| Vulnerability 7 | 0.7124 | 0.6871 | 0.8589 | 0.9000 | 0.7730 |
| Vulnerability 8 | 0.5923 | 0.9538 | 0.2035 | 0.9500 | 0.1933 |
| Vulnerability 9 | 0.6210 | 0.8550 | 0.4128 | 0.9000 | 0.3715 |
| Vulnerability 10 | 0.6002 | 0.9207 | 0.2699 | 0.9500 | 0.2564 |
| Vulnerability 11 | 0.6685 | 0.8550 | 0.5137 | 1 | 0.5137 |
| Vulnerability 12 | 0.5666 | 0.6871 | 0.5490 | 0.9000 | 0.4941 |
| Vulnerability 13 | 0.7786 | 0.6871 | 0.9997 | 0.9000 | 0.8997 |
| Vulnerability 14 | 0.4962 | 0.7844 | 0.2532 | 0.9500 | 0.2406 |

FIG. 10

METHODS AND SYSTEMS FOR DEFENDING CYBER ATTACK IN REAL-TIME

CROSS REFERENCE TO RELATED APPLICATIONS

This application depends from and claims priority to U.S. Provisional Application No. 62/204,118 filed Aug. 12, 2015, entitled, "Methods and Systems for Cyber Real-Time Risk Assessment," the entire contents of which is incorporated herein by reference.

GOVERNMENT INTEREST

The invention described herein may be manufactured, used, and licensed by or for the United States Government.

REFERENCE TO COMPUTER PROGRAM LISTING APPENDIX

This application contains and refers to Computer Program Listing Appendix A and Computer Program Listing Appendix B, the entire contents of which are incorporated herein by reference.

FIELD

The present invention relates generally to the field of cyber security assessment and, more particularly, to a system, method and apparatus for assessing a cyber risk within an operational technology infrastructure.

BACKGROUND

Risk in a network or operational technology infrastructure is usually defined as the probability that an adverse event or action occurs and results in a negative impact or consequence. In the context of cyber security, risk refers to the expected likelihood and consequences of threats or attacks on cyber assets. Risk assessment involves identifying threats and vulnerabilities, computing the occurrence likelihood of threats, and then determining the impact and consequences of exploiting vulnerabilities by threats. The minimal requirement for the risk assessment of any system is to characterize threats, vulnerabilities, effectiveness and operational status of the system's defenses for particular threats.

Risk quantification needs the scoring of vulnerabilities. In this regard, the Security Content Automation Program (SCAP), developed by the National Institute of Standards and Technology (NIST), supports the National Vulnerability Database (NVD) providing a repository for known vulnerabilities and software that contains these vulnerabilities. As part of SCAP, the Common Vulnerability Scoring System (CVSS) provides a score for each new software vulnerability discovered that prioritizes the importance of the vulnerability. In addition to scoring vulnerabilities, risk quantification requires the scoring of exploit likelihood and attack impact, so that the simplest risk score of an individual vulnerability can be obtained by the product of its exploit likelihood and impact.

A major issue with prior methods of assessing risk is that they do not have the ability to dynamically determine risk to any particular region of a network and project that risk to a time in the future. The methods and systems as provided herein address this problem by progressively developing a dynamic representation of cyber vulnerabilities, exploitation, and observations of a network using integrated Bayesian, Markov, and state space models in order to encode dynamically quantitative and qualitative knowledge and measurements of cyber security vulnerabilities, exploits, and attack impacts.

SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

Provided are processes, systems, and apparatuses suitable for identifying risk and defending attacks in cyber assets such as networked cyber infrastructure and other systems and devices connected to or exposed to an externally accessible network. The processes provided herein are unique, real-time methods of identifying and defending against attack of one or more critical assets that can identify how vulnerabilities in a cyber critical asset are related, are or could potentially be subjected to an attack and how such an attack may flow through a network so that such an attack can effectively be stopped, prevented, or otherwise defended.

It is a first object to provide processes of defending attack of one or more critical assets within a network of electronically interconnected devices in real-time. Such processes may include one or more of: identifying a plurality of vulnerabilities on a network of electronically interconnected devices representing one or more critical assets; determining dependencies between each vulnerability in said plurality of vulnerabilities; creating a hidden Markov model for the plurality of vulnerabilities and their relevant observations, where each state of the model represents the attack state of a distinct vulnerability; determining the exploit likelihood of each of the vulnerabilities at a first time; determining the impact of exploitation of each of the vulnerabilities at the first time; determining the most probable sequences or paths of attack states representing exploited vulnerabilities; and identifying dynamically the risk of one or more of said critical assets based on exploit likelihood and exploitation impact of said sequences or paths of attack states to thereby defend against any potential or identified attack within the network. In some aspects, one or more of the plurality of vulnerabilities is a group of two or more vulnerabilities grouped as desired by a user illustratively such as a group from a single network asset. In some aspects, the step of determining dependencies between each vulnerability includes obtaining a set of relevant electronic observations for the plurality of vulnerabilities. Optionally, the step of identifying a plurality of vulnerabilities includes obtaining vulnerability data obtained from one or more vulnerability scanners. A process optionally further includes generating vulnerability-host information to associate each of the vulnerabilities with a host. A process optionally further includes assigning initial scores to each of the vulnerabilities based on a vulnerability scoring system. A vulnerability scoring system is optionally the common vulnerability scoring system. In some aspects, the assigning of initial scores to each of the vulnerabilities includes generating random numbers in an array of integer values, optionally creating a table of the vulnerabilities with qualitative attributes; and optionally creating a table of the initial scores. In some aspects, the step of creating a hidden Markov model includes using a conditional probability table of a Dirichlet distribution. Optionally, the process further includes iteratively repeating the step of creating a hidden Markov model to reduce the margin of errors of emission rates. Optionally, the step of determining the exploit likelihood of each of the attack states at a first time includes using state transition weights or probabilities of all incoming links of the attack state and calculating an impact of each attack state using the state transition weights or probabilities of outgoing links of each attack state. Optionally, the step of determining the exploit likelihood of each of the attack states includes considering weights of all incoming links; and determining the impact of each attack state by considering weights of all outgoing links. Optionally, the step of determining the most probable sequences or paths of attack states includes determining which of the vulnerabilities are exploited. Optionally, the step of determining the most probable sequences or paths of attack states is determined using a Viterbi algorithm based on weights of state transition links and observations. In some aspects, a process further includes creating a coupled hidden Markov model at a second time, where the coupled hidden Markov model has as many chains as number of vulnerabilities such that each chain's states represent the attack state of a distinct vulnerability. In some aspects a process includes recursively creating a plurality of coupled hidden Markov models over a plurality of time slices subsequent to the second time to measure risk. In some aspects, a process further includes updating continuous state parameters corresponding to percentage of good, vulnerable and comprised nodes in a state space model of cyber systems using a Kalman filter to filter out noise in the computations of exploit likelihood and impact of vulnerability exploitation, optionally by iteratively determining vulnerability dependencies based on the state space model. Optionally, a process includes creating a second hidden Markov model representing an attack state of each vulnerability of the plurality of vulnerabilities with vulnerability dependencies identified using the state space model; determining a second exploit likelihood of each of said attack states at a third time; determining the most probable sequences or paths of attack states; and identifying dynamically the risk of one or more of said critical assets based on said sequences or paths of attack states.

The processes are optionally employed on a specifically configured or purposed computer or computer system. The processes are optionally performed by a coded non-transitory computer readable medium. As such, also provided is a non-transient computer readable medium for storing computer instructions that, when executed by at least one processor, causes the at least one processor to perform a process of dynamically assessing a risk or defending attack of one or more critical assets within a network of electronically interconnected devices in real-time including: a code segment assigning vulnerability scores to a plurality of vulnerabilities identified within a network of electronically interconnected devices, where common vulnerability scoring system is used to assign the initial vulnerability scores; and a code segment for recursively creating a hidden Markov model by enabling each hidden state to represent the attack state of one distinct vulnerability from said plurality of vulnerabilities and observations.

BRIEF DESCRIPTION OF THE DRAWINGS

FIG. 9 illustrates the identity and characteristics of 14 vulnerabilities along with their initial assigned values of CVSS metrics in the beginning of a risk assessment process in an exemplary data set;

FIG. 10 illustrates the calculated CVSS values as the initial values of each of 14 identified vulnerabilities in an exemplary data set;

DETAILED DESCRIPTION

Figure 1:
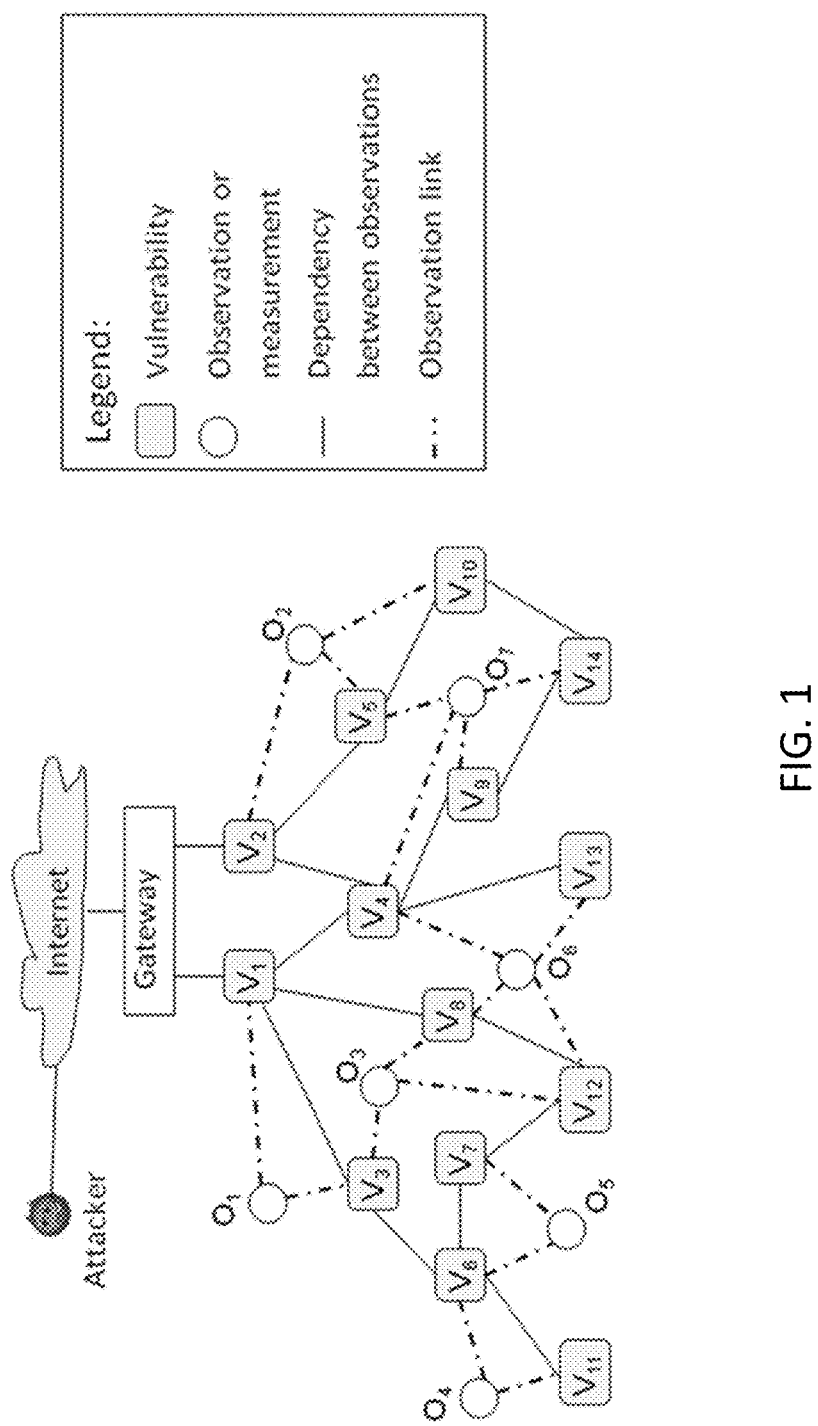
FIG. 1 illustrates an exemplary network with 14 vulnerabilities and 7 observations.

The following description of particular aspect(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Using prior systems, obtaining all required knowledge of cyber security events and activities within a network for assessing its cyber risk in real-time is extremely difficult due mainly to uncertainties or unexplained patterns of network traffic, incomplete or noisy attack measurements and observations, and insufficient information about vulnerabilities and cyber assets. The systems and methods provided herein dynamically build additional relationships and dependencies among detected vulnerabilities and sensor measurements so that risk assessment can be achieved more accurately and in real-time by encoding the available quantitative and qualitative knowledge of vulnerabilities and exploits on integrated Markov, Bayesian, and state space models. The processes and systems provided are also expected to significantly enhance cyber resilience, agility, and detection operations of cyber security in part because their effective implementation utilizes real-time, dependable risk assessment.

The methods and systems provided herein progressively build as many relationships and dependencies as possible among detected vulnerabilities in a system or network and observations of sensor measurements. The system then provides a novel way of interpreting the transition/emission rates and parameters of these models in terms of cyber parameters and operations such as vulnerability, exploit likelihood and impact. Specifically, the transition rates of outgoing and incoming links of states in hidden and coupled Markov models are used in determining exploit likelihood and impact of attacks, while emission rates are used to help determine the attack states of vulnerabilities. A state space model and Kalman filter are used to estimate the range of changes in state variables, and then this information is fed as input to the Markov models as they are run optionally iteratively and in real-time.

As used herein, the term "risk" is a function of: (1) a "cyber threat" exercising a set of potential "cyber vulnerabilities" on one or a set of "critical cyber assets" (CCA) supporting a "critical asset" (CA); and (2) the resulting impact of the vulnerability on such critical asset (CA).

As used herein, the term "cyber threat" is any circumstance or event with the potential for a "threat source" to successfully compromise any exposed cyber vulnerabilities.

As used herein, the term "threat source" or "attacker" is defined as a potential source, either human or technological, with the motivation, capability, and intent to cause harm to an infrastructure or other network of electronically interconnected devices.

As used herein, the term "vulnerability" is an inherent weakness in a critical cyber asset that could be exploited by a threat source.

As used herein, the term "critical cyber assets" are network mutable electronic components that are part of control or data acquisition systems that monitor, manage or command operational equipment.

As used herein, the term "critical asset" is defined as a physical component essential to the operation of the infrastructure.

As used herein, the term "impact" is the magnitude of disruption that can be expected in terms of safety, economic, and mission to the infrastructure if critical asset is compromised.

The processes provided herein are capable of real-time determinations of risk within critical infrastructure such as illustratively for public utilities (e.g., electricity, water, gas), national critical infrastructure protection (CIP) assets as defined by the United States Department of Homeland Security, (e.g., bridges, roads), educational institutions and facilities (e.g., universities), and government agencies in the United States and from other nations.

Areas for network vulnerabilities illustratively include data integrity, security, protocol encryption, authentication and device hardware. Some specific examples include a lack of integrity checking of communication, ineffective network security architectures, physical access to a device, and weaknesses in authentication process or authentication keys.

Software and firmware design as well as their development and deployment can have vulnerabilities and of course, also result in or be the target of attacks. Software and firmware development include vulnerabilities in code quality, authentication, cryptography, general logic errors and password management. Common Vulnerability and Exposures (CVE) specification are used to establish a common identifier for vulnerability as well as some other descriptions from the Common Weakness Enumeration (CWE) and vulnerability categories defined by the Open Web Application Security Project (OWASP).

Given N multi-stage vulnerabilities detected by a vulnerability scanner in a network, the provided methods and systems assess cyber risk of a network by quantifying the exploit likelihood and exploitation impact of all vulnerabilities within the next k units of time based on all sensor measurements and observations in the network. To assist in description, consider FIG. 1 depicting fourteen multi-stage vulnerabilities. A vulnerability is termed a first-state vulnerability (e.g., $V_1$, $V_2$) if it can be exploited directly by an attacker either internal to a network or accessing a network or node from an external location or device such as through the internet. A vulnerability is termed a second-stage vulnerability (e.g., $V_3$, $V_4$) if it can be exploited only after exploiting a first-stage vulnerability. Similarly, the exploitation of a k-stage vulnerability can be triggered only after the exploitation of (k–1)-stage vulnerability. In some aspects, a vulnerability is itself a plurality of vulnerabilities. As an example, an asset may be controlled by a system that itself includes a plurality of vulnerabilities where the asset may be connected to or integral to a larger system or network. The processes as provided optionally consider such a plurality of vulnerabilities on a single or group of assets a single vulnerability for purposes of the process when combined with other identified vulnerabilities outside the asset. The number of vulnerabilities is not limiting.

Figure 7B:
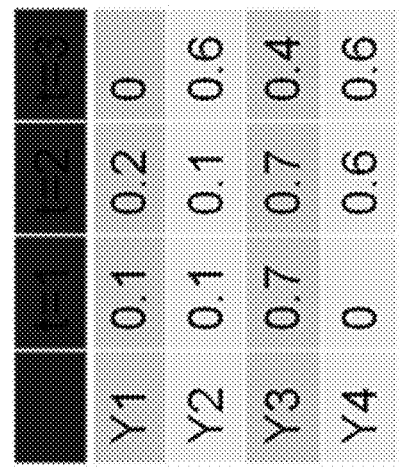
FIG. 7B illustrates exemplary observations at three different time slices for the CHMM shown in FIG. 7A.

The process of assessing risk according to some aspects as provided herein is illustrated by the flow chart of FIG. 2 and is optionally run on a computer system as a vulnerability assessment module. The first step 201 considers all those vulnerabilities detected by one or more vulnerability scanners in a given time interval whereby a vulnerability scanner or multiple vulnerability scanners are used to scan the network for vulnerabilities and output the results to a database. A vulnerability scanner output is one or more vulnerabilities detected by network- or host-based scanners. An intrusion detection system (IDS) output is network- or host-based IDS alerts. A network monitoring tool can generate packet capture (i.e., pcap) data. A port scanning tool results in port scanning data. A firewall's rulesets constitute firewall information. All these IDS alerts, pcap and port-scanning data, firewall rulesets, authentication and file access logs, open ports data, behavioral analysis information of IDS tools, etc are observations of cyber sensors that help detect network and attacker activities and are used to identify the vulnerabilities. The second step 202 builds a Bayesian graph to determine dependencies and relationship among the vulnerabilities identified in the first step and then classifies the vulnerabilities into multi-stages. The third step 203 assigns the initial vulnerability scores using CVSS attributes. The fourth step 204 creates a HMM or optionally a CHMM, such that every state of the HMM represents the attack state of a distinct vulnerability identified in the first step 201, and the relevant cyber observations and measurements correspond to the state's observation. The fifth step 205 determines the initial probabilities of every state of HMM from the fourth step 204 using a Bayesian network and an appropriate distribution function, optionally a Dirichlet distribution. The sixth step 206 repeats the run of HMM until the margin of errors of transition and emission rates are acceptable. A common platform such as Matlab is optionally used. The seventh step 207 computes the exploit likelihood of each attack state by considering the weights of all of its incoming links (i.e., all of its incoming state transition probabilities) and calculates the impact of each attack state by considering the weights of all the outgoing links (i.e., all of its outgoing state transition probabilities). The eighth step determines the most probable paths of attack states of HMM representing those vulnerabilities to be exploited. The ninth step 209 reruns and analyses steps of steps 204-208 recursively over time using a CHMM with two or more time slices or dynamic Bayesian network (DBN). From the preceding nine steps, step 10 assess the risk for use in mission assurance and resilience. A risk assessment is optionally output to a display that illustrates the risk assessment to a user or operator. In optional aspects, a Kalman filter shown in FIG. 7B is provided to update continuous state parameters G, V, and C of the state space model, shown in FIG. 7A corresponding to the percentage of good, vulnerable and compromised nodes, respectively, using the exploit likelihood and impact parameters of HMM or CHMM that are obtained in the current risk assessment. This updated data is used to update the state parameters used in determining vulnerability dependencies used to repeat the process beginning at step 201. The recursive nature of the system in real-time serves to improve risk assessment throughout the network as new vulnerabilities are identified and attack states change.

Figure 3:
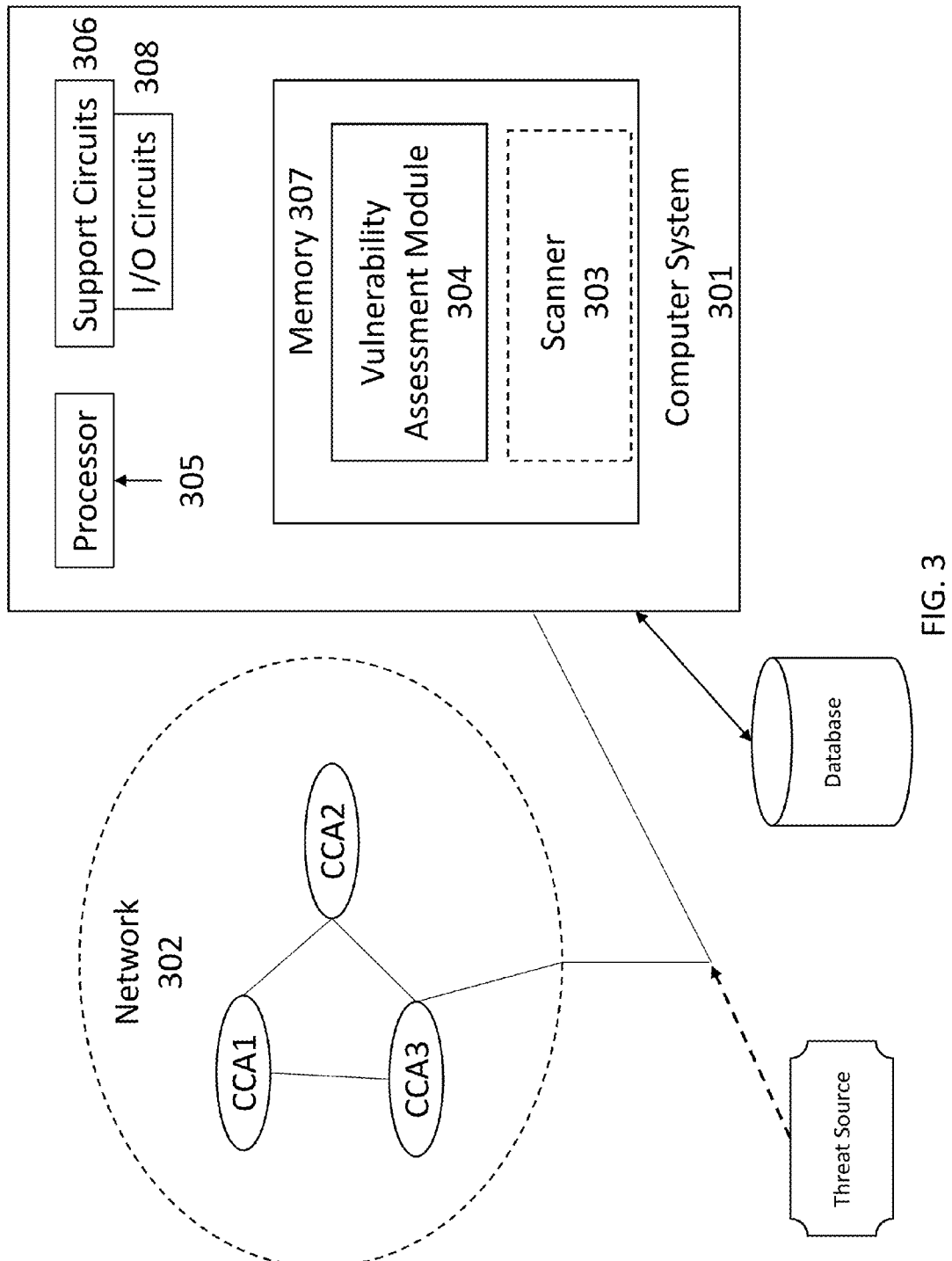
FIG. 3 illustrates an exemplary computer system linked to one more critical cyber assets (CCA) via a network that may be accessed by a threat source.

A process may be run in a vulnerability assessment module as a form of software implemented on a computer system that optionally runs as a stand-alone system or as a component of a network of electronically interconnected computer systems. An illustrative computer system 301 for operating a vulnerability assessment module is illustrated in FIG. 3. The computer system 301 is connected either directly or via a network 302 to one or more CCAs that are either directly connected to each other or via a network. In some aspects, the computer system 301 is itself a CCA, is a remote system, or is a portion of a CCA. The computer system employs a vulnerability scanner 303 such as any scanner software known in the art. The vulnerability scanner is optionally a software component of the computer system itself, is housed on a separate computer system in electronic communication with the computer system, or is optionally housed on one or more CCAs. It is appreciated that more than one vulnerability scanner may be used and may be housed at any location with a connection to one or more CCAs and the computer system 301. The computer system 301 monitors the plurality of CCAs on the network by use of the vulnerability scanner or receives vulnerability data (e.g. IDS alerts, pcap and port-scanning data, firewall rulesets, authentication and file access logs, open ports data, behavioral analysis information of IDS tools, etc.) from one or more vulnerability scanners through the use of the vulnerability assessment module 304. The vulnerability assessment module is optionally a continually run process or is run on demand initiated either by user input or by receipt of a new time slice of information, or from receipt of one or more vulnerabilities from a vulnerability scanner. Optionally, a vulnerability assessment module is run when one or more CCAs are added to or removed from a network.

The computer system 301 comprises a processor 305, various support circuits 306, and memory 307. The processor 305 may include one or more microprocessors such as known in the art. The support circuits 306 for the processor 305 include conventional cache, power supplies, clock circuits, data registers, I/O interface 308, and the like. The I/O interface 308 may be directly coupled to the memory 307 or coupled through the support circuits 306. The I/O interface 308 may also be configured for communication with input devices and/or output devices such as network devices, various storage devices, mouse, keyboard, display, video and audio sensors, IMU, RF receivers and RF transmitters or the like. Those of ordinary skill in the art will recognize that the computer system 301 may be coupled to other computer systems to form a larger computer network.

The memory 307, or a computer readable medium, stores non-transient processor executable instructions and/or data that may be executed by and/or used by the processor 305. These processor-executable instructions may include firmware, software, and the like, or some combination thereof. Modules having processor-executable instructions that are stored in the memory 307 comprise a vulnerability assessment module 304.

The computer system 301 may be programmed with one or more operating systems, which may include OS/2, Java Virtual Machine, Linux, SOLARIS, UNIX, HPUX, AFX, WINDOWS, IOS, and ANDROID, among other known platforms. The memory 307 may include one or more of random access memory, read only memory, magneto-resistive read/write memory, optical read/write memory, cache memory, magnetic read/write memory, and the like, as well as signal-bearing media.

To further describe the processes provided herein, each step of FIG. 2 will be described in greater detail. Block 201 represents a consideration of a set of vulnerabilities detected by vulnerability scanner. Vulnerability scanners are software based, hardware based, or both. Illustrative examples of a vulnerability scanner can be found from Tenable Network Security as the Nessus vulnerability scanner. At step 201, the number of vulnerabilities at every stage are determined using a Poisson random process where the Poisson mean arrival rate, $\lambda$, is made equal to the number of detected vulnerabilities at time t.

Figure 2A:
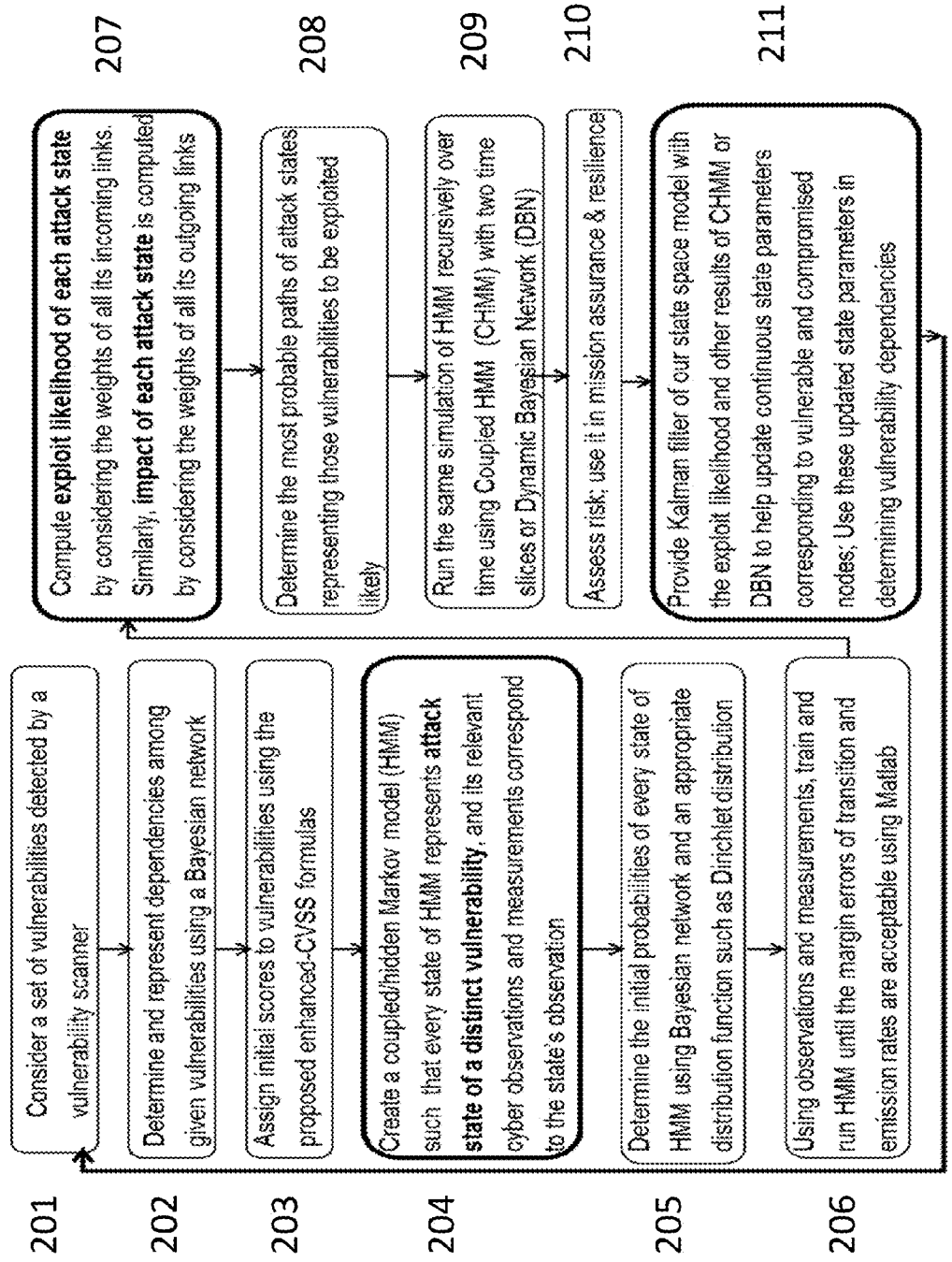
FIG. 2A illustrates a flow diagram of a process of assessing risk of one or more critical assets within a network of electronically interconnected devices according to one aspect.
Figure 2B:
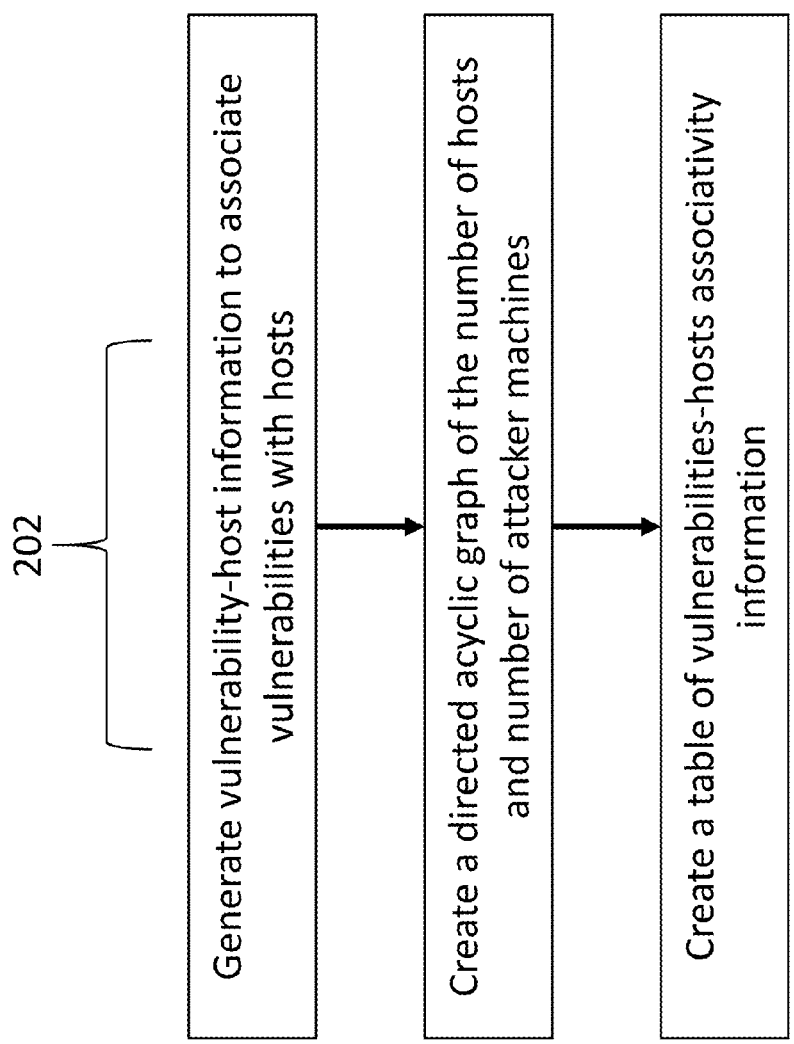
FIG. 2B illustrates a flow diagram of a process of determining dependencies on a given set of vulnerabilities.

At step 202 the process determines and represents dependencies among given vulnerabilities using a Bayesian network illustratively as depicted in FIG. 2B. If vulnerability scanner dataset/results are provided, construct a vulnerability graph of N vulnerabilities using their CVE, CVSS information as well as other available information such as topology and hosts. If, however, a vulnerability scanner dataset is not provided, then generate/predict vulnerability-host information in order to associate vulnerabilities with some hosts. Then create a directed acyclic graph of the number of hosts and number of attacker machines. A table is then created of the associativity of the vulnerabilities and/or hosts to identify and organize the vulnerabilities per dependencies among them. The detected vulnerabilities are thereby organized by dependencies throughout the network or system. Such a set of known interrelated relationships functions to categorize each recognized vulnerability according to risk of attack either directly or through another vulnerability. For example, a first stage vulnerability can be directly accessed through a gateway to an external environment such as the internet without the requirement for intermediate access through another vulnerability in the system. A second stage vulnerability is accessible only through prior access by a first stage vulnerability such that to access the second stage vulnerability two vulnerabilities must be exploited to form an effective attack toward the second stage vulnerability. The number of vulnerability stages is defined by the network and relationships between the established vulnerabilities and is not externally limited.

Figure 2C:
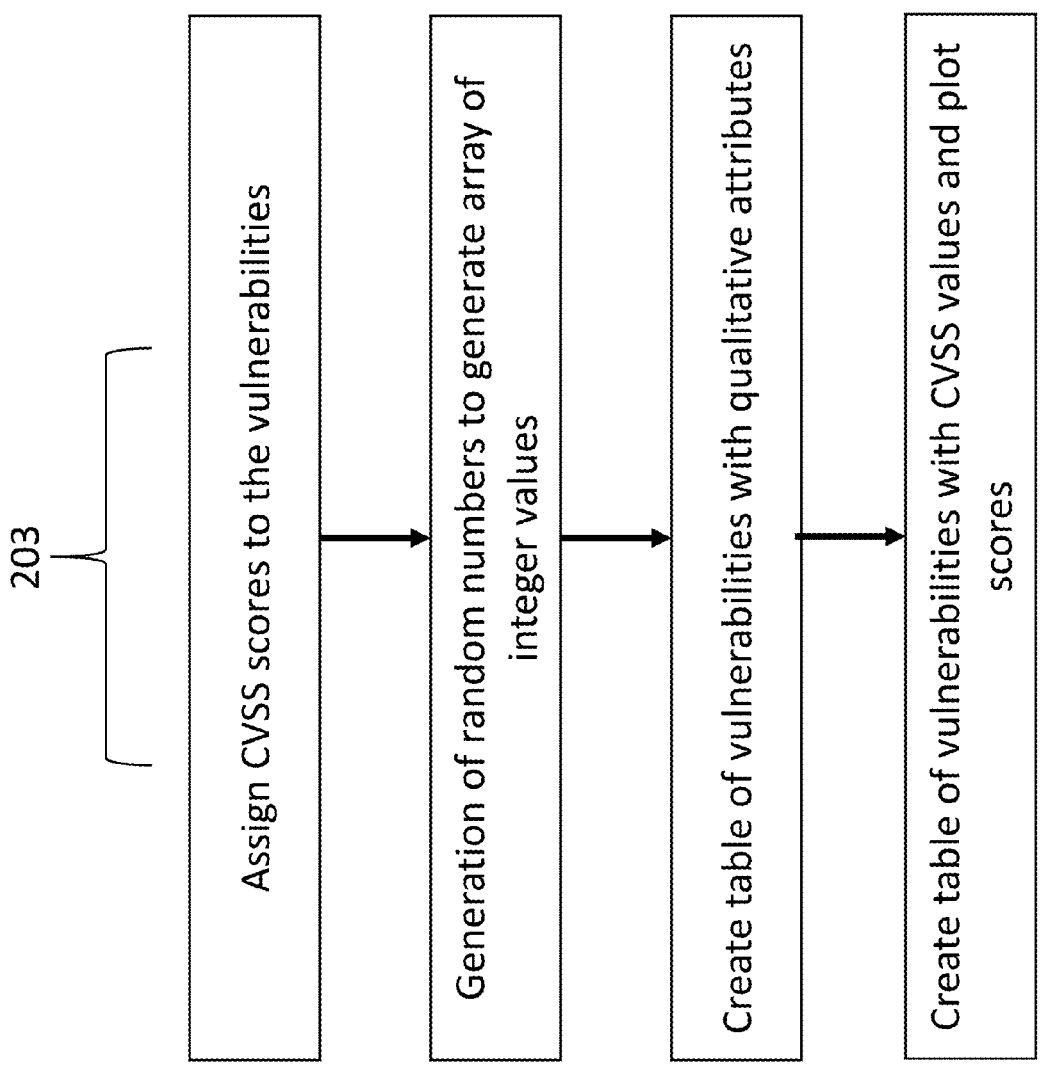
FIG. 2C illustrates a process of assigning initial scores to vulnerabilities using a common vulnerability scoring system.
Figure 2D:
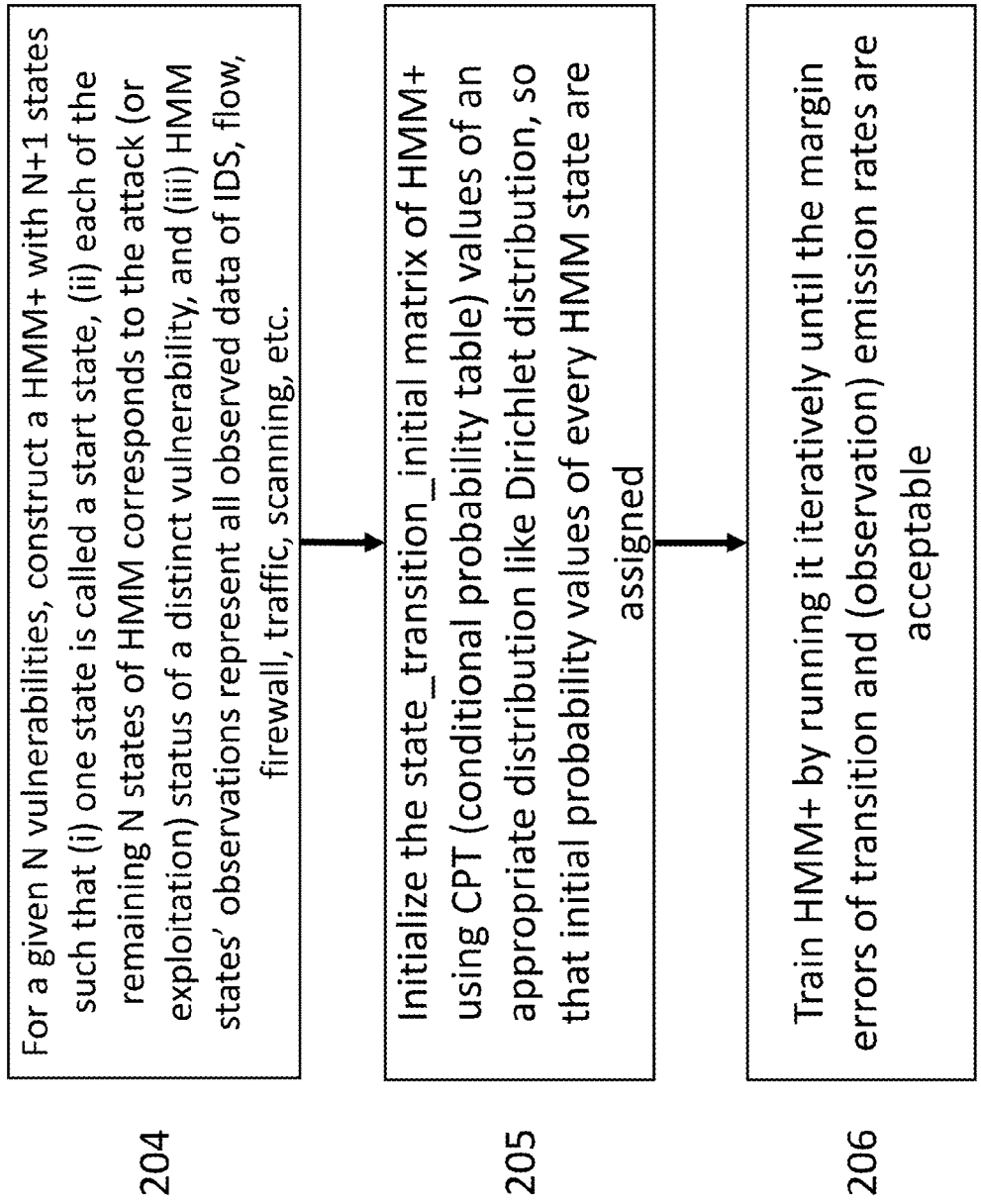
FIG. 2D illustrates additional details of steps 204, 205, and 206 of FIG. 2A.

At the third stage, initial scores are assigned to each vulnerability in block 203 using the Common Vulnerability Scoring System (CVSS) that provides an open framework for communicating the characteristics and impacts of IT vulnerabilities. The CVSS is made up of three main metric groups and each consisting with a set of metrics for calculating the vulnerability score that include metrics for base, temporal and environmental. It is not required to evaluate all three metric groups. Optionally, the base score can be refined by assigning values to the temporal and environmental metrics. Depending on the type of assessment required, the base score calculation and vector may be sufficient. Mell P, Scarfone K, Romanosky. "The Common Vulnerability Scoring System (CVSS) and its Applicability to Federal Agency Systems," NISTIR 7435, August 2007. Additional specific description of determining scores from the CVSS system can be found in U.S. Patent Application Publication No: 2014/0137257. The vulnerability score will range from 0 to 10. An exemplary process for this is illustrated at FIG. 2C and at step 203. Each of the vulnerabilities is assigned scores of base, impact, temporal exploitability, access vector, access complexity, authentication, confimpact, integimpact, availimpact, remediation level, report confidence, collateral damage potential, target distribution, among others if desired. These numbers are then organized into an array of integers with the dimensions of the array representing the vulnerabilities and scores. A table of the vulnerabilities with qualitative attributes is then generated. Finally, a table of the vulnerabilities and their assigned CVSS scores is generated.

Figure 4:
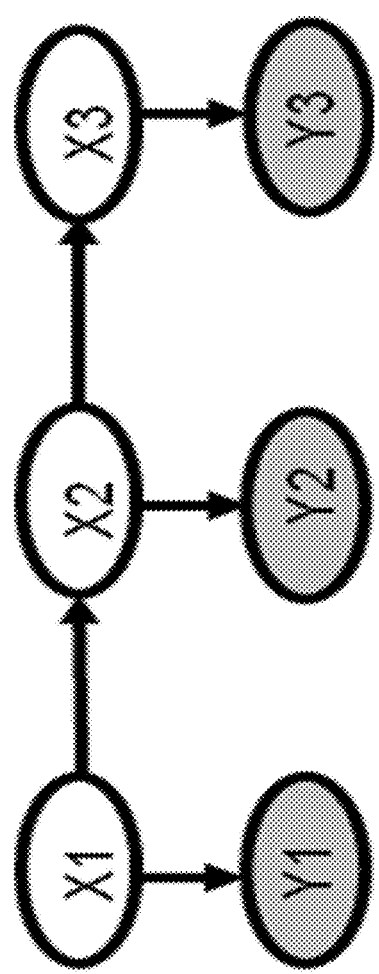
FIG. 4 illustrates a simple hidden Markov model for a network that includes three vulnerabilities, namely V1, V2 and V3, where X1, X2 and X3 represent their attack states, respectively, and Y1, Y2 and Y3 represent relevant noisy observations.

The fourth step illustrated at 204 is the creation of an HMM that represents the attack state of each vulnerability that was previously identified. FIG. 4 illustrates a basic HMM for a single vulnerability. In FIG. 4 shaded nodes represent observations and unshaded nodes are hidden states such as those derived from IDS alerts, scan reports, pcap data, among others. HMM includes unobserved (hidden) states that are not directly visible to observer, but (noisy) output is visible. A sequence of emissions is observed, without knowing what sequence of states has generated them. Thus, at time 1, the single random variable of HMM represents system exploit status and has as many attack states as the number of vulnerabilities. The HMM is run where the number of observations equals the number of vulnerabilities, k, where each observation is relevant to a distinct vulnerability. The number of states is equal to k+1, where state 1 represents the normal state with no vulnerability exploitation, while state i for i>1 represents the exploitation of any i−1 vulnerabilities. The attack state values, however, vary because they depend on the particular properties of the vulnerabilities. There are 2k+1 nodes in the HMM.

As a more detailed example, consider the condition of a network with four identified vulnerabilities labeled V1 to V4, respectively. Using an analogous numerology to FIG. 4, X1, X2, X3, X4 represent the attack states of vulnerabilities V1, V2, V3, and V4, respectively. Further, Y1, Y2, Y3, Y4 represent (noisy) observations of each of the four vulnerabilities, respectively. Outgoing link rates (transition rates) of state Xi are a function of the impact of Xi's exploitation, and incoming link rates of state Xi are a function of the exploit likelihood of Xi's vulnerability. The observation symbol probability distribution, B, depends on how well observation characteristics match with vulnerability signature (conditions). The state transition probability distribution, A, is determined by random selection processes associated with vulnerabilities, depending on their relationships; for instance, a next-state selection process could be rolling a die with different probabilities at each side. Finally, the initial state distribution, c, is determined by the statistical exploitability data of first-stage vulnerabilities.

Figure 2E:
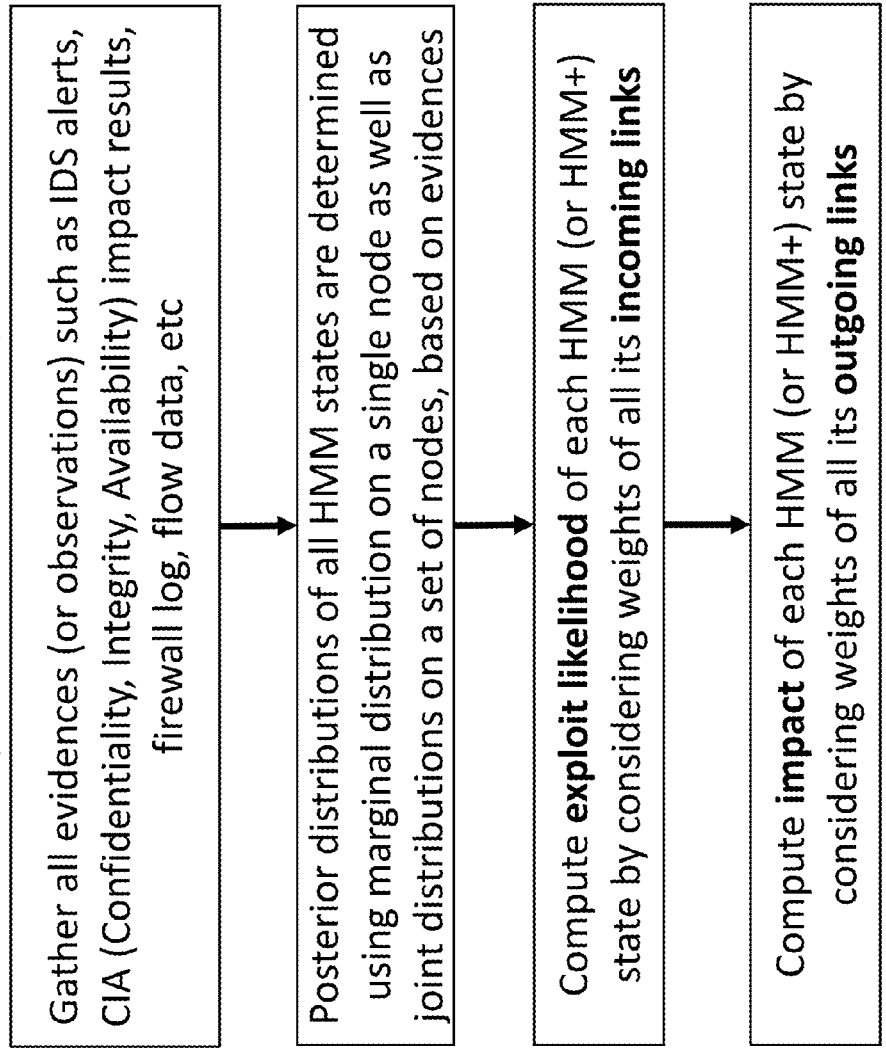
FIG. 2E illustrates processes by which the exploit likelihood of teach attack state is computed at step 207 of FIG. 2A.
Figure 2F:
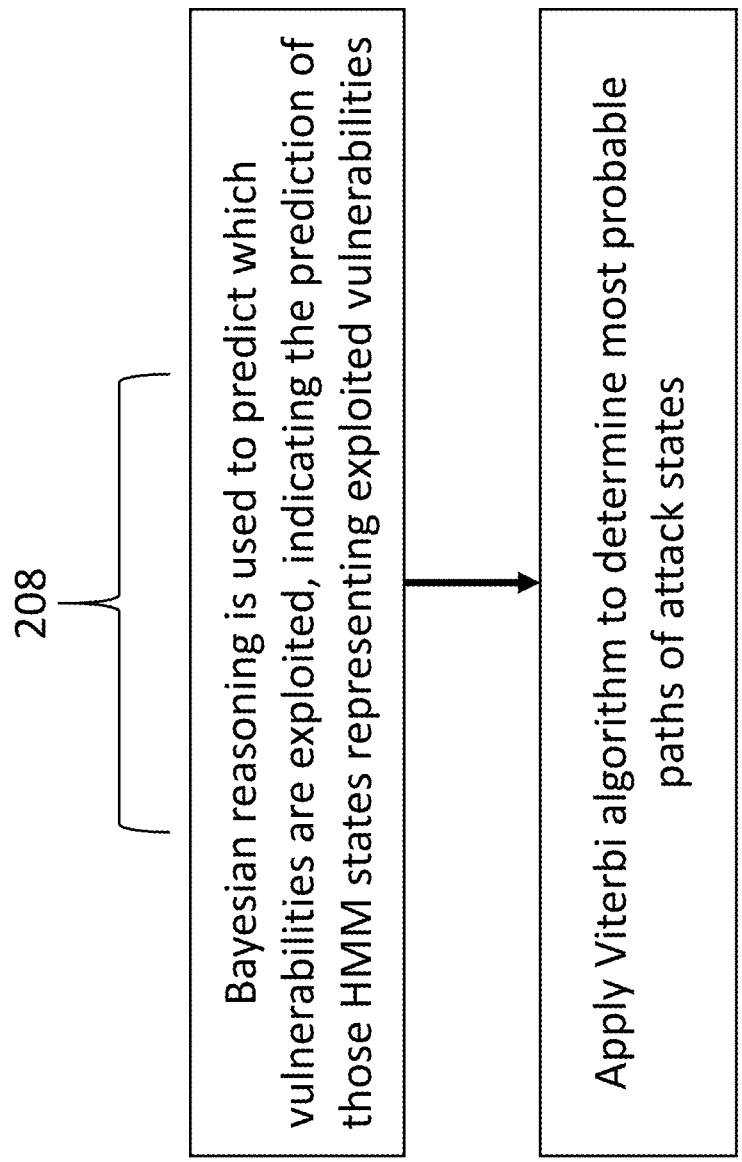
FIG. 2F illustrates processes by which the exploit likelihood of teach attack state is computed at step 208 of FIG. 2A.
Figure 5B:
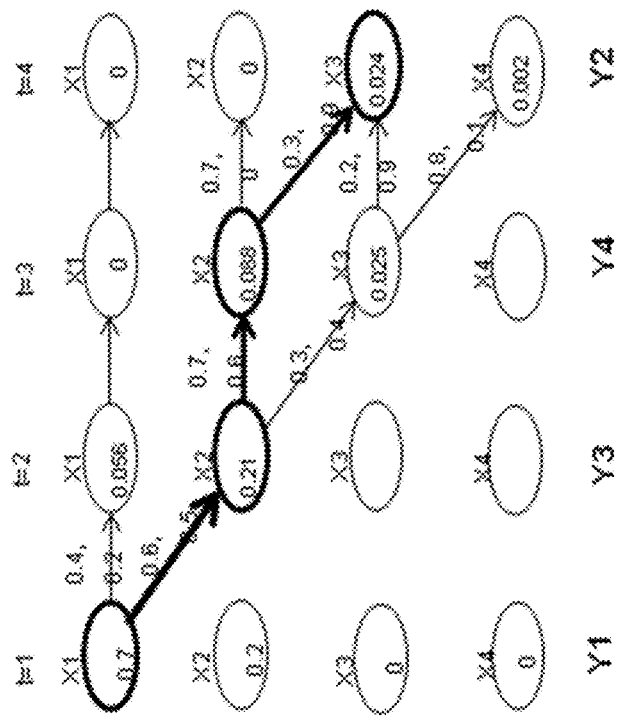
FIG. 5B illustrates the most probable single path of true attack states of the HMM for an exemplary set of observations shown in FIG. 5A.
Figure 5A:
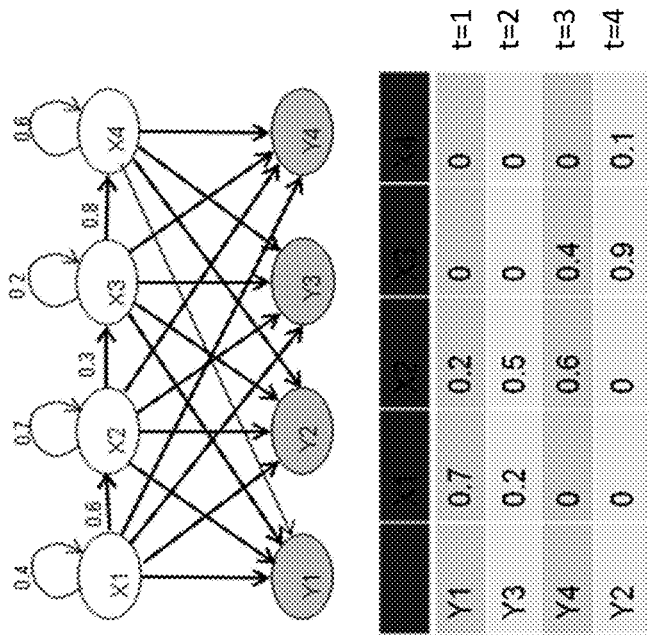
FIG. 5A illustrates a simple hidden Markov model (HMM) for a network that includes four vulnerabilities with exemplary four electronic observations; where in the risk process as provided herein, each state of HMM represents the attack state of a distinct vulnerability, where all states of HMM are represented by a single random variable.
Figure 6:
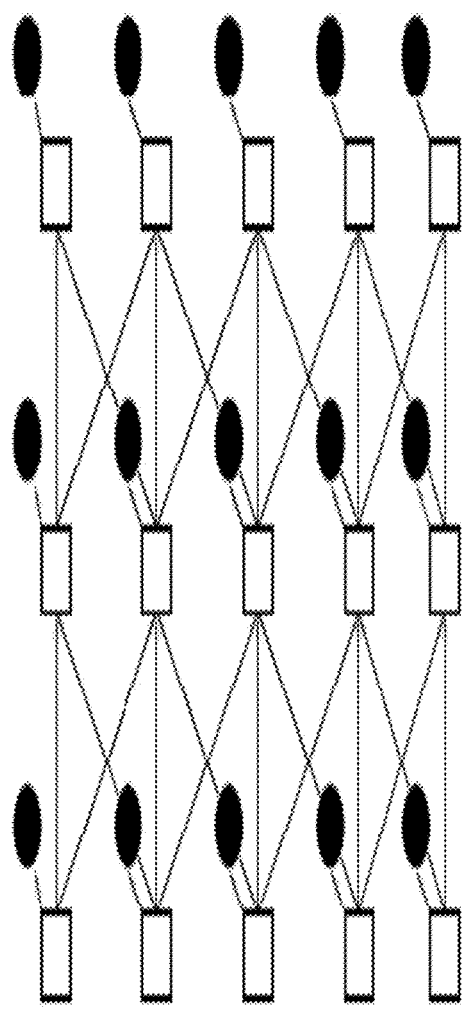
FIG. 6 illustrates an exemplary coupled hidden Markov model (CHMM) with five chains; wherein the risk process as provided herein, each chain of CHMM corresponds to a distinct random variable such that the states of the chain represent the attack states of a distinct vulnerability.

With four given observations, a model can be formed as illustrated in FIG. 5A. From these observations and arrangement in the HMM, the most probable path of true attack states can be determined 207, 208. As illustrated in FIG. 2E, step 207 is achieved by gathering all the evidences or observations. The posterior distributions of all HMM states are determined using marginal distribution on a single node as well as joint distributions on a set of nodes based on the evidences gathered. The weights of all incoming links are then used to compute the exploit likelihood of each HMM. Similarly, the weights of all the outgoing links are used to compute the impact of each HMM state. These exploit likelihoods and weights of the outgoing links are then used in step 208 as illustrated in FIG. 2F where Bayesian reasoning is used to predict which of the vulnerabilities are exploited. From this, a Viterbi algorithm is used to determine the most probable paths of attack states.

As a further example of steps 207 and 208, for a given sequence of observations at four different slices of time (t=1 to 4) representing observations Y1, Y3, Y4, Y2, respectively, the probability of ending up in state j at time t is equal to (Probability of ending up in state i at time t−1)*(Transition rate from state i to j)*(Probability of observation at time t). At time t=1, the observation Y1 has the highest vulnerability exploitation distribution or probability on state X1 and, therefore, the attack path starts in state X1. At time t=2, the observation Y3 is obtained, with the distributions of 0.2 and 0.5 on states X1 and X2, respectively. Now, as it follows from the above formula, state X1 can either self-transition to itself with probability (0.7×0.4×0.2=0.056), or transition to X2 with probability (0.7×0.6×0.5=0.21). This latter option is taken by X1 since 0.21 is larger than 0.056. Next, at time t=3 with observation Y4, state X2 can either self-transition to itself with probability (0.21×0.7×0.6=0.088), or transition to X3 with probability (0.21×0.3×0.4=0.025). This first option is taken by X2 since 0.088 is larger than 0.025. Finally, at time t=4 with observation Y2, state X2 can either self-transition to itself with probability (0.088×0.7×0=0), or transition to X3 with probability (0.088×0.3×0.9=0.024). This latter option is taken by X2 since 0.024 is larger than 0. Thus, the most probable sequence or path of attack states is X1, X2, X2, X3 (using Modified Viterbi Decoding) as is depicted in FIG. 5B. This sequence of attack states is obtained when the HMM is used, indicating the sequence of vulnerabilities V1, V2, and V3 to be exploited most probably. Once these vulnerabilities are identified, then the exploit likelihood and impact of each vulnerability are computed based on the incoming and outgoing transition probabilities or weights of their attack states, leading to their risk assessment.

Figure 7A:
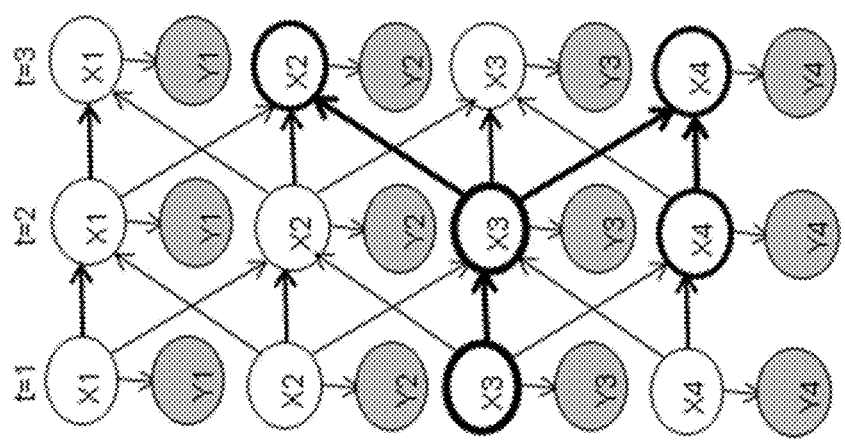
FIG. 7A illustrates a CHMM with four chains, each representing the attack states of a distinct vulnerability, and four observations.

In some aspects, the vulnerabilities and observations that are used in the HMM simulation is rerun recursively over time using a coupled hidden Markov model (CHMM) as is indicated in step 209. In a CHMM, each hidden variable interacts locally with its neighboring hidden variables while each hidden node has its own observation. In the processes provided herein, each chain represents a random variable corresponding to the exploit status of distinct vulnerability. An exemplary CHMM is depicted in FIG. 7. Determining the most probable multiple paths of true attack states in CHMM is illustrated in FIG. 7A by the exemplary situation as per above where X1, X2, X3, X4 are CHMM chains, where $X_i$ represents attack state of $V_i$ (the $i^{th}$ variable). Each chain $X_i$ has its own observation $Y_i$. FIG. 7A illustrates a CHMM model with exemplary observations at three different time slices illustrated in FIG. 7B.

The output of the recursively run HMM and CHMM provides a measure of risk that can be used in determining mission resilience and assurance. Specifically, the identification and sequence of attack states indicate the identity and sequence of vulnerabilities to be exploited most probably. Then, the exploit likelihood and impact of each vulnerability to be exploited most probably are computed based on the incoming and outgoing transition probabilities or weights of their attack states, leading to their risk assessment.

In some aspects, the state space model created at step 202 is reassessed using a Kalman filter to update continuous state parameters corresponding to the percentage of good, vulnerable and compromised nodes, as illustrated in FIG. 7A and FIG. 7B. The updated state parameters may then be used in determining vulnerability dependencies for use in a following iterative process as described herein. By using a series of (Gaussian) noisy and inaccurate measurements observed over time, the Kalman filter produces a statistically optimal estimate of underlying system state such that the estimates of unknown variables tend to be more precise than those based on a single measurement alone. Due to the recursive nature of the Kalman filter algorithm, it can run in real-time using only the present input measurements and the previously calculated state and its uncertainty matrix.

As an example to ease the presentation of using Kalman filter for estimating system state variables, we will consider only the following three system state variables, namely, G(t), V(t), and C(t) that represent the percentage of good, vulnerable, and compromised assets, respectively at time t. Because it is very difficult to observe all events of a cybersecurity environment due to various reasons, the above system state variables are estimated. Therefore, the input of the Kalman filter algorithm is a set of sensor measurements and a linear Gaussian state space model. The outputs of the algorithm are estimates of the system state variables G(t), V(t), and C(t).

Figure 8:
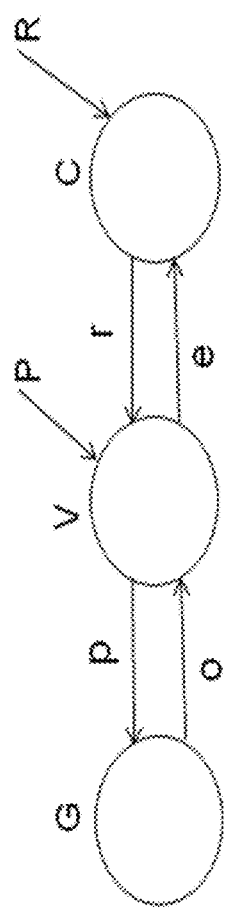
FIG. 8 illustrates an exemplary linear cybersecurity system where R(t): recovery support services rate, P(t): patching support services rate, o(t0): vulnerability occurrence rate, p(t0): vulnerability patching rate, e(t0): vulnerability exploitability rate, and r(t0): compromised systems recovery rate.
Figure 11:
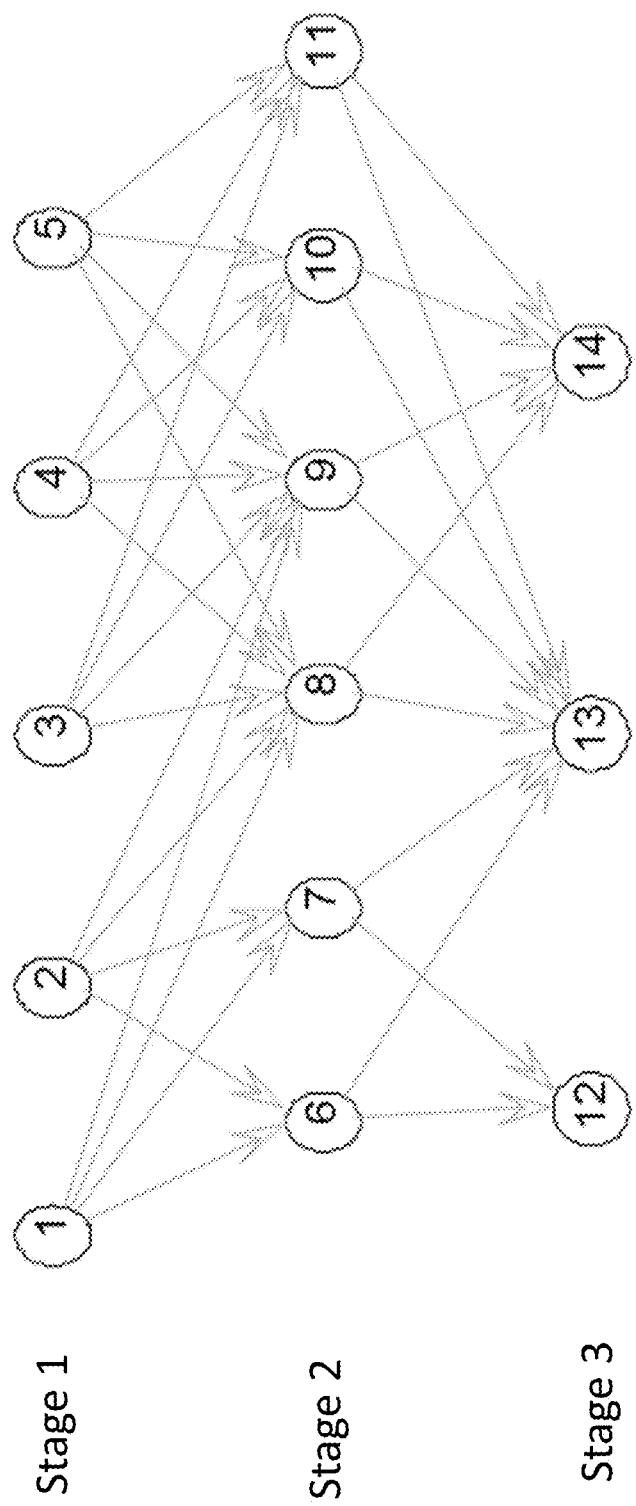
FIG. 11 illustrates a Bayesian graph of 14 vulnerabilities in an exemplary data set illustrating the multi-stage relationships and dependencies between the vulnerabilities.

To model a cyber-physical system using the linear/non-linear time-invariant systems, we consider a network or system of N assets or nodes, where N(t)=G(t)+V(t)+C(t), and N(t) is the total percentage of nodes in the system at time t, G(t) denote the percentage of those nodes that do not have any known vulnerability at time t, V(t) denotes the percentage of those nodes that have some known vulnerabilities at time t, but are not exploited yet, and C(t) denotes the percentage of those nodes that are compromised partially/fully through the exploitation of their vulnerabilities. The cybersecurity environment of a cyber-physical system can be modeled as a linear system. An exemplary cybersecurity model with linear system equations for such a system is illustrated in FIG. 8. In this model, let R(t): recovery support services rate; P(t): patching support services rate; $o(t_0)$: vulnerability occurrence rate; $p(t_0)$: vulnerability patching rate; $e(t_0)$: vulnerability exploitability rate, and $r(t_0)$: compromised systems recovery rate. P(t) and R(t) denote the inputs based on recovery and patching support operations, respectively. Also, let C(t) and V(t) denote the outputs that can be measured. Then, the system can be described as follows:

$$\dot{x}(t) = \dot{G}(t), \dot{V}(t), \dot{C}(t))$$

$$u(t) = (P(t), R(t))$$

$$y(t) = (C(t), V(t))$$

Differential equations of the (simplified) model shown can be written as $$\dot{G}(t) = pV(t) - oG(t)$$

$$\dot{V}(t) = oG(t) + rC(t) - pV(t) - eV(t) + P(t)$$

$$\dot{C}(t) = eV(t) - rC(t) + R(t)$$

Assuming that system state variables G(t), V(t), C(t), E(t), and F(t) are linear, the system state can be expressed using the first-order linear differential equations as follows:

$$\hat{x}(t) = Ax(t) + Bu(t)$$

$$\begin{bmatrix} \hat{G}(t) \\ \hat{V}(t) \\ \hat{C}(t) \end{bmatrix} = \begin{bmatrix} -o & p & 0 \\ o & -e-p & r \\ 0 & e & -r \end{bmatrix} \begin{bmatrix} G(t) \\ V(t) \\ C(t) \end{bmatrix} + \begin{bmatrix} 0 & 0 \\ 1 & 0 \\ 0 & 1 \end{bmatrix} \begin{bmatrix} P(t) \\ R(t) \end{bmatrix}$$

$$\begin{bmatrix} V(t) \\ C(t) \end{bmatrix} = \begin{bmatrix} 0 & 1 & 0 \\ 0 & 0 & 1 \end{bmatrix} \begin{bmatrix} G(t) \\ V(t) \\ C(t) \end{bmatrix}$$

These equations can also be expressed in discrete time as follows:

$$x_{k+1} = Ax_k + Bu_k$$

$$\begin{bmatrix} G_{k+1} \\ V_{k+1} \\ C_{k+1} \end{bmatrix} = \begin{bmatrix} -o & p & 0 \\ o & -e-p & r \\ 0 & e & -r \end{bmatrix} \begin{bmatrix} G_k \\ V_k \\ C_k \end{bmatrix} + \begin{bmatrix} 0 & 0 \\ 1 & 0 \\ 0 & 1 \end{bmatrix} \begin{bmatrix} P_k \\ R_k \end{bmatrix}$$

$$\begin{bmatrix} V_k \\ C_k \end{bmatrix} = \begin{bmatrix} 0 & 1 & 0 \\ 0 & 0 & 1 \end{bmatrix} \begin{bmatrix} G_k \\ V_k \\ C_k \end{bmatrix}$$

For estimating the system state variables $G_n$, $V_n$ and $C_n$ representing the percentage of good, vulnerable and compromised assets, respectively, using Kalman filter, in one example, we consider a three-dimensional linear Gaussian state space model, where $u_k$ is ignored for simplicity and M=D=3.

$$x_n = F_n x_{n-1} + v_n$$

$$y_n = H_n x_n + w_n$$

where $F_n$ is the D×D state-transition matrix, $v_n$ is a D×1 Gaussian random state noise vector with zero mean and covariance matrix $Q_n$, $H_n$ is the M×D measurement matrix, and $w_n$ is a M×1 Gaussian random measurement noise vector with zero mean and covariance matrix $R_n$. This Gaussian space model can be used to express our system state and output equations as:

$$\begin{bmatrix} G_n \\ V_n \\ C_n \end{bmatrix} = \begin{bmatrix} -o & p & 0 \\ o & -e-p & r \\ 0 & e & -r \end{bmatrix} \begin{bmatrix} G_{n-1} \\ V_{n-1} \\ C_{n-1} \end{bmatrix} + \begin{bmatrix} v_{n,1} \\ v_{n,2} \\ v_{n,3} \end{bmatrix}$$

The state vector $x_n = [G_n \ V_n \ C_n]^T$ is three dimensional. Based on the calculations of $e(V_t)$ and $r(V_t)$ in the previous section, along with the previous measurements of p and o, let e=0.05, r=0.01, p=0.10, and o=0.15. Thus, the state transition matrix Fn is written as:

$$P_n = \begin{bmatrix} -0.15 & 0.10 & 0 \\ 0.15 & -0.15 & 0.01 \\ 0 & 0.05 & -0.01 \end{bmatrix},$$

and the state noise vector $v_n = [v_{n,1} \ v_{n,2} \ v_{n,3}]^T$ is 3×1 and Gaussian with zero mean and covariance matrix $$Q_n = \sigma_x^2 \begin{bmatrix} 1 & 0 & 0 \\ 0 & 1 & 0 \\ 0 & 0 & 1 \end{bmatrix}.$$

We obtain noisy measurements of $G_n$, $V_n$ and $C_n$, so that we can express the measurement process as $$\begin{bmatrix} y_{n,1} \\ y_{n,2} \\ y_{n,3} \end{bmatrix} = \begin{bmatrix} 1 & 0 & 0 \\ 0 & 1 & 0 \\ 0 & 0 & 1 \end{bmatrix} \begin{bmatrix} G_n \\ V_n \\ C_n \end{bmatrix} + \begin{bmatrix} w_{n,1} \\ w_{n,2} \\ w_{n,3} \end{bmatrix},$$

where the measurement noise vector $w_n = [w_{n,1} \ w_{n,2} \ w_{n,3}]^T$ is 3×1 and Gaussian with zero mean and covariance matrix $$R_n = \sigma_y^2 \begin{bmatrix} 1 & 0 & 0 \\ 0 & 1 & 0 \\ 0 & 0 & 1 \end{bmatrix}.$$

Also, note that the measurement matrix $H_n$ is the 3×3 identity matrix. We developed a script in Matlab to estimate the percentage of good, vulnerable, and compromised assets, denoted by $G_n$, $V_n$ and $C_n$, using the Kalman filter. Hence, the Kalman filter provides a better estimate of the system state variables $G_n$, $V_n$ and $C_n$ after some parameters of the above state equations such as exploit likelihood e and vulnerability occurrence rate o are updated with their new values obtained through HMM or CHMM.

Some aspects include determining the magnitude of risk associated with any one or collection of vulnerabilities of the network as a whole, optionally assigning a risk score, and optionally displaying a risk score, identified vulnerabilities, or combinations thereof on a monitor or other display apparatus. With respect to determining if the risk level is high in decision block 210 of FIG. 2A, the magnitude of the risk is evaluated to determine if the risk is high on a critical asset. This consists of the consolidation of multiple risks on a critical asset. If risk is high, then a further optional step of identifying and evaluating security countermeasures to mitigate risk may be performed. General security countermeasures are applied to critical assets with a low risk.

According to some aspects, a process includes identifying and evaluating strategies, treatments, or security countermeasures to reduce or eliminate the identified risk. Risks can be managed by one of four distinct methods: risk acceptance, risk avoidance, risk control, or risk transfer. Department of Homeland Security, "Risk Management Fundamentals," April 2011. Risk acceptance is defined as an explicit or implicit decision not to take an action that would affect a particular risk. Risk avoidance is defined as a strategy or measure which effectively removes the exposure of an organization to a risk. Risk control is defined as any of one or more deliberate actions taken to reduce a risk's potential for harm or maintain the risk at an acceptable level. Finally, risk transfer is defined as shifting some or all of the risk to another entity, asset, system, network, or geographic area. Any one or more of these recognized countermeasures may be taken in response to assessment of risk according to the processes provided herein. The use of any one or more of the foregoing countermeasures are optionally necessitated or directed by the current assessment of risk in the network at any particular time. Following a countermeasure, the process of assessing risk is optionally performed using a new vulnerability identification and mapping and processing according to the vulnerability assessment module and processes as provided to assess risk under the new state of the network.

The processes herein provide a systematic and comprehensive approach for assessing cyber risk of a system in real-time as long as vulnerability scanners and network defense sensors provide continuously credible observations and measurements of network and hosts such as vulnerability detections, intrusion alerts, flow and pcap (packet capture) data of network traffic, authentication and file access logs, open ports data, behavioral analysis results of intrusion detection tools, and firewall rulesets.

In addition, the processes consider not only atomic attacks or single-stage attacks but also multi-stage attacks that exploit the inter-dependent vulnerabilities between hosts. This type of analysis is expected to provide better cyber defense against attacks, and to determine more accurately the operational status of systems and particular hosts. Determining individual vulnerabilities of nodes is the first necessary step in computing their security levels. One standard technique for measuring individual vulnerabilities is called Common Vulnerability Scoring System (CVSS). After vulnerabilities and threats are measured individually, they need to be measured collectively by taking their relationships and combined impact on compromising resources. Bayesian network and attack graphs are employed mostly to encode the relationships and dependencies among vulnerabilities, threats, attacks, and/or exploits. Bayesian network serves as a good belief model tool for data rich domains like threat detection by providing an efficient evidence propagation mechanism and powerful reasoning capability.

Various aspects of the present invention are illustrated by the following non-limiting examples. The examples are for illustrative purposes and are not a limitation on any practice of the present invention.

EXAMPLES

A Matlab simulator is developed to implement every step of the method by developing custom programs, along with the open-source Bayesian Network Toolbox. The objective is to consider vulnerabilities of a real network detected by a vulnerability scanner, while obtaining observations from real data of network intrusions, firewalls, and other sensor measurements. While this system and method may be used to parse real vulnerability and netDefense data, the following examples were conducted using synthetic data. The coded process assessing risk for an exemplary set of synthetic data representing 14 identified vulnerabilities is illustrated in Appendix A with the Kalman filter process illustrated in Appendix B.

The first step is to consider all those vulnerabilities detected by one or more vulnerability scanners in a given time interval. The synthetic data used in this example identified 14 vulnerabilities using the Nessus vulnerability scanner. The dependencies and relationship among these vulnerabilities are assessed by calculating their Common Vulnerability Scoring System (CVSS) attributes as is achieved using the National Vulnerability Database from the National Institute of Standards and Technology. The identified vulnerabilities are depicted in FIG. 9 and CVSS scores of the exemplary data as calculated by the system are illustrated in FIG. 10.

The vulnerabilities were then classified into multi-stages and Bayesian graph constructed to represent them. Observation data is obtained in the form of IDS alerts log, firewall log, or pcap data in two time intervals. A start state, labeled node 1, is added to the HMM, and this observation data is associated with each of the vulnerabilities and labeled to have more realistic transition matrices during HMM training.

Figure 12:
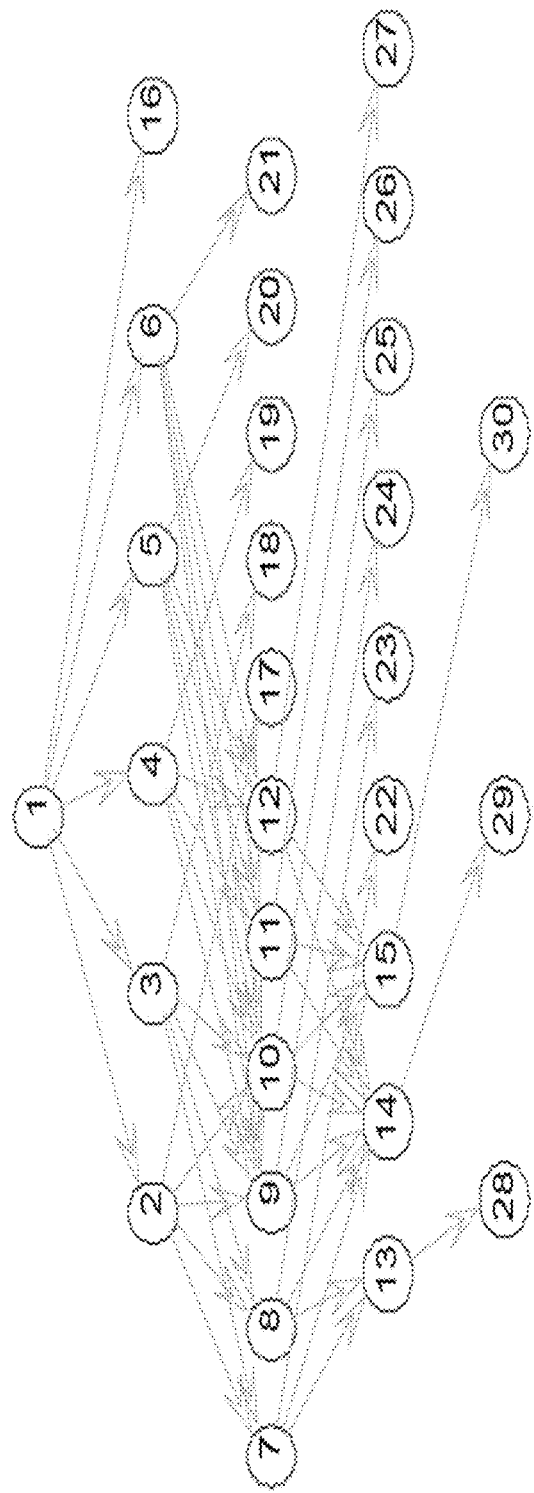
FIG. 12 illustrates the HMM and the start state 1, denoted HMM+, where nodes 2 to 15 represent the attack states of 14 vulnerabilities, and nodes 16 to 30 represent the relevant observations of the start state and 14 vulnerabilities.

A (Bayesian) hidden Markov model and a (Dynamic Bayesian) coupled hidden Markov model are constructed whose states represent attack states of vulnerabilities, while the observations of these models correspond to the collected observation data. FIG. 12 illustrates the relationships between the vulnerabilities and the observation data where the 14 vulnerabilities are represented by attack state nodes labeled 2-15 (due to the newly added start state labeled as node 1) and the observations are labeled 16-30. All attack states and the start state together represent the system state at time t. The HMM models were trained by initializing their transition and emission matrices with the Bayesian posterior distributions and evidences, and then determining the sequence of "true" attack states to quantify system risk by considering exploit likelihood and impact of all true attack states.

Figure 13:
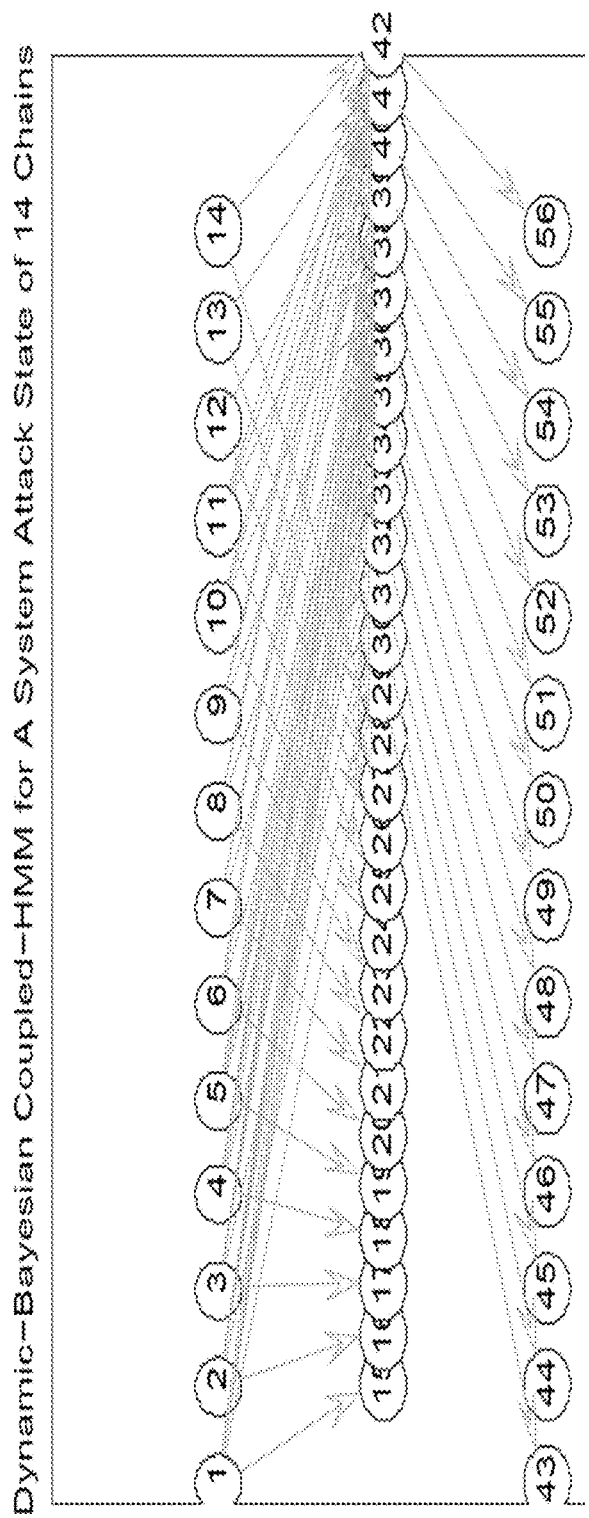
FIG. 13 illustrates the CHMM with 14 chains at two time steps t=1 and t=2 for the 14 vulnerabilities, where each chain has 2 nodes of attack states and 2 nodes of observations.
Figure 14:
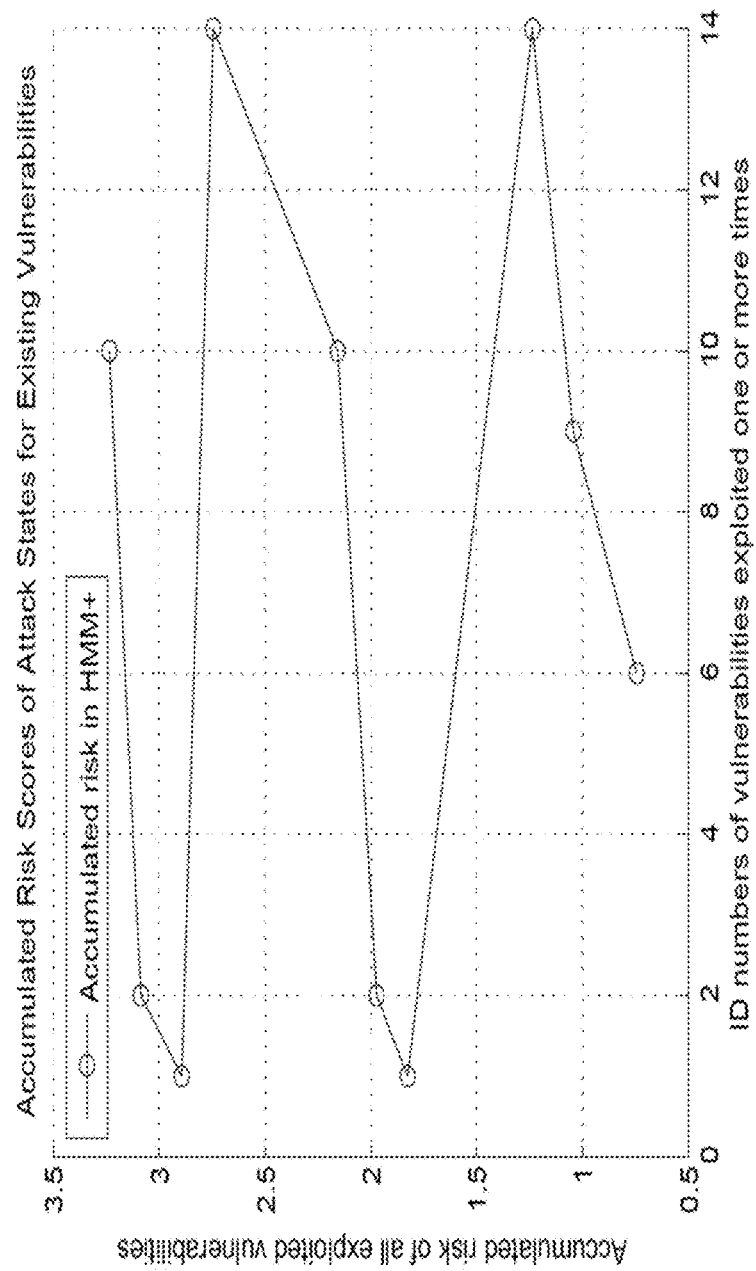
FIG. 14 illustrates accumulated risk scores of attack states in the HMM+ from the state sequence corresponding to the exploited vulnerabilities: [6 9 14 1 2 10 14 1 2 10 14 1 4 10]
Figure 15:
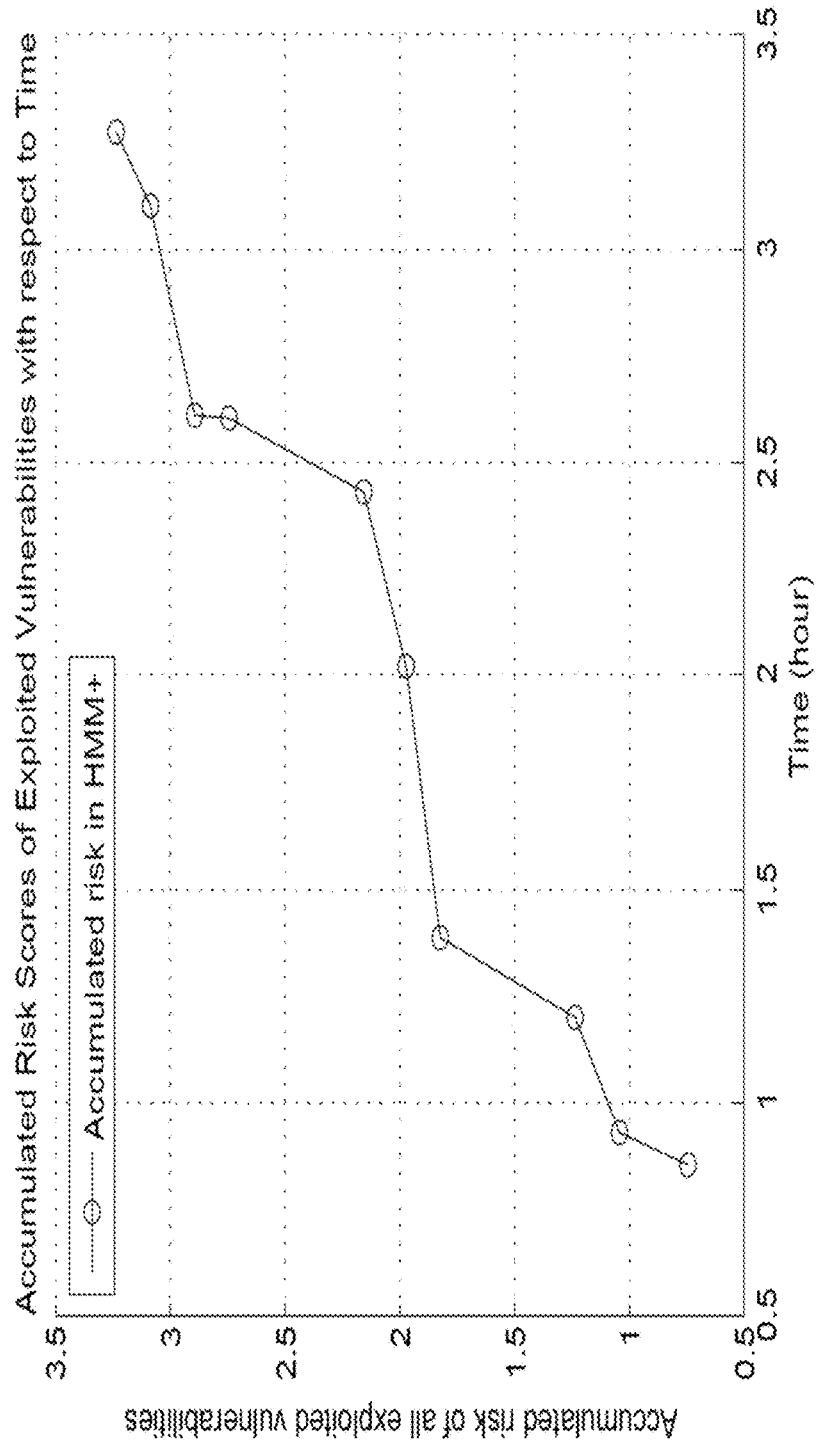
FIG. 15 illustrates accumulated risk scores of attack states in the HMM+ with respect to time from the state sequence corresponding to the exploited vulnerabilities: [6 9 14 1 2 10 14 1 2 10 14 1 4 10].

The transition matrices of HMM and Coupled HMM (based on two-slice dynamic Bayesian network) ware initialized with the estimated conditional probability distributions of the Bayesian network built for the given vulnerabilities, while the emission matrices of HMM are initialized with the sensors' observations (e.g., IDS alerts, firewall log). Then, they are "trained" by iterating recursively as new evidences/observations of sensors arrive in. At the end of these iterations (for example, after 500 or 1000 iterations) of HMM matrices, the attack impact of an HMM state is determined as a factor of its outgoing transition rates, while the exploit likelihood of an HMM state is computed as a factor of its incoming transition rates, where each HMM state corresponds to the potential exploitation of a distinct vulnerability. The coupled HMM at time t and t+1 are illustrated in FIG. 13. In the figure at t=1 the attack states of CHMM are labeled 1 to 14 and the observations are labeled 15 to 28. Slice 2 is obtained at time t+1 where the slice 2 attack states are labeled 29 to 42 and observations are labeled 43 to 56. All (28) attack states together represent the system state at two time slices (e.g., time t and time t+1); hence, system states at t and t+1 have 28 attack states, where CHMM has 14 chains, each corresponding to a distinct random variable that represent the attack states of a distinct vulnerability. Attack state k of slice 1 is connected to slice 1's observation k+14 and slice 2's attack state k+28. The accumulated risk scores of attack states in HMM+ are shown when the experimental data simulator results in the attack state sequence of the vulnerabilities to be exploited most probably: [6 9 14 1 2 10 14 1 2 10 14 1 4 10], which is a vector of true attack states as illustrated in FIG. 14. The accumulated risk scores of attack states in the HMM+ with respect to time are shown in FIG. 15 when experimental data simulator results in the state sequence: [6 9 14 1 2 10 14 1 2 10 14 1 4 10], which is a vector of true attack states.

Various modifications of the present invention, in addition to those shown and described herein, will be apparent to those skilled in the art of the above description. Such modifications are also intended to fall within the scope of the appended claims.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular aspects of the invention, but is not meant to be a limitation upon the practice thereof. The following claims, including all equivalents thereof, are intended to define the scope of the invention.

I claim:

1. A process for defending attack of one or more critical assets within a network of electronically interconnected devices in real-time comprising:
    identifying a plurality of vulnerabilities on a network of electronically interconnected devices representing one or more critical assets;
    determining dependencies between each vulnerability in said plurality of vulnerabilities;
    creating a hidden Markov model for said plurality of vulnerabilities and their relevant observations, where each state of the model represents an attack state of a distinct vulnerability;
    determining an exploit likelihood of each of said vulnerabilities at a first time;
    determining an impact of exploitation of each of said vulnerabilities at said first time;
    determining a most probable sequences or paths of attack states representing exploited vulnerabilities; and
    identifying dynamically a risk of one or more of said critical assets based on exploit likelihood and exploitation impact of said sequences or paths of attack states,
    wherein said step of determining the exploit likelihood of each of said attack states at a first time comprises using state transition weights or probabilities of all incoming links of the attack state and calculating an impact of each attack state using the state transition weights or probabilities of outgoing links of each attack state in the hidden Markov model.

2. The process of claim 1 wherein said step of determining dependencies between each vulnerability comprises obtaining a set of relevant electronic observations for said plurality of vulnerabilities.

3. The process of claim 1 wherein said step of identifying a plurality of vulnerabilities comprises obtaining vulnerability data obtained from one or more vulnerability scanners.

4. The process of claim 1 wherein one or more of said plurality of vulnerabilities is a group of two or more individual vulnerabilities.

5. The process of claim 1 further comprising generating vulnerability-host information to associate each of said vulnerabilities with a host.

6. The process of claim 1 further comprising assigning initial scores to each of said vulnerabilities based on a vulnerability scoring system.

7. The process of claim 6 wherein said vulnerability scoring system is a common vulnerability scoring system.

8. The process of claim 6 further comprising generating random numbers in an array of integer values;
    creating a table of said vulnerabilities with qualitative attributes; and
    creating a table of said initial scores.

9. The process of claim 1 wherein said step of creating a hidden Markov model comprises using a conditional probability table of a Dirichlet distribution.

10. The process of claim 1 further comprising iteratively repeating said step of creating a hidden Markov model to reduce the margin of errors of emission rates.

11. The process of claim 1 wherein said step of determining the exploit likelihood of each of said attack states further comprises:
    considering weights of all incoming links; and
    determining the impact of each attack state by considering weights of all outgoing links.

12. The process of claim 1 wherein said step of determining the most probable sequences or paths of attack states comprises determining which of said vulnerabilities are exploited.

13. The process of claim 1 wherein said step of determining the most probable sequences or paths of attack states is determined using a Viterbi algorithm based on weights of state transition links and observations.

14. The process of claim 1 further comprising creating a coupled hidden Markov model at a second time, where the coupled hidden Markov model has as many chains as number of vulnerabilities such that each chain's states represent the attack state of a distinct vulnerability.

15. The process of claim 14 further comprising recursively creating a plurality of coupled hidden Markov models over a plurality of time slices subsequent to said second time to measure risk.

16. The process of claim 1 further comprising updating continuous state parameters corresponding to percentage of good, vulnerable and comprised nodes in a state space model of cyber systems using a Kalman filter to filter out noise in the computations of exploit likelihood and impact of vulnerability exploitation.

17. The process of claim 16 further comprising iteratively determining vulnerability dependencies based on said state space model.

18. The process of claim 17 further comprising creating a second hidden Markov model representing an attack state of each vulnerability of said plurality of vulnerabilities with vulnerability dependencies identified using said state space model;
    determining a second exploit likelihood of each of said attack states at a third time;
    determining the most probable sequences or paths of attack states; and
    identifying dynamically the risk of one or more of said critical assets based on said sequences or paths of attack states.

19. A non-transient computer readable medium comprising computer instructions that, when executed by at least one processor, causes the at least one processor to perform a process for defending attack of one or more critical assets within a network of electronically interconnected devices in real-time, the process comprising:
    identifying a plurality of vulnerabilities on a network of electronically interconnected devices representing one or more critical assets;
    determining dependencies between each vulnerability in said plurality of vulnerabilities;

creating a hidden Markov model for said plurality of vulnerabilities and their relevant observations, where each state of the model represents an attack state of a distinct vulnerability;

determining an exploit likelihood of each of said vulnerabilities at a first time; determining an impact of exploitation of each of said vulnerabilities at said first time;

determining a most probable sequences or paths of attack states representing exploited vulnerabilities; and identifying dynamically a risk of one or more of said critical assets based on exploit likelihood and exploitation impact of said sequences or paths of attack states, wherein said step of determining the exploit likelihood of each of said attack states at a first time comprises using state transition weights or probabilities of all incoming links of the attack state and calculating an impact of each attack state using the state transition weights or probabilities of outgoing links of each attack state in the hidden Markov model.

* * * * *